(12) United States Patent
Igarashi et al.

(10) Patent No.: US 7,409,199 B2
(45) Date of Patent: Aug. 5, 2008

(54) DIRECT CONVERSION RECEIVER WITH DC OFFSET COMPENSATION

(75) Inventors: Masatoshi Igarashi, Souraku-gun (JP); Hiroshi Komori, Otsu (JP); Takeaki Watanabe, Mukou (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 450 days.

(21) Appl. No.: 11/238,644

(22) Filed: Sep. 29, 2005

(65) Prior Publication Data
US 2006/0073803 A1 Apr. 6, 2006

(30) Foreign Application Priority Data
Oct. 1, 2004 (JP) .............................. 2004-289766

(51) Int. Cl.
*H04B 1/10* (2006.01)
(52) U.S. Cl. ...................... 455/296; 455/63.1; 455/209; 455/280; 455/190.1; 455/231
(58) Field of Classification Search ................. 455/296, 455/63.11, 209, 280, 190.1, 231
See application file for complete search history.

(56) References Cited

U.S. PATENT DOCUMENTS 6,535,725 B2    3/2003   Hatcher et al.
2002/0160740 A1* 10/2002 Hatcher et al. .............. 455/317
2004/0087296 A1* 5/2004  Park et al. ................... 455/285
2006/0068749 A1* 3/2006  Ismail et al. ................ 455/339
2006/0141972 A1* 6/2006  Matsuno ...................... 455/313

* cited by examiner

*Primary Examiner*—Sanh D Phu
(74) *Attorney, Agent, or Firm*—Hamre, Schumann, Mueller & Larson, P.C.

(57) ABSTRACT

A direct conversion receiver includes a mixer for converting an RF signal into a baseband signal, a dynamic DC offset compensator for compensating for a dynamic DC offset caused by the effect of second order nonlinear distortion of the mixer on an interfering wave that enters the input terminals of the mixer, and a static DC offset compensator for compensating for a static DC offset caused by self-mixing of a local signal and a leakage component of the local signal that appears at the input terminals of the mixer. The static DC offset compensation starts at a time t1 after a DC offset compensation operation has started. The static DC offset compensation is finished at the next time t2, and then the dynamic DC offset compensation starts. The dynamic DC offset compensation is finished at the next time t3. With this configuration, only a change in DC offset due to the dynamic DC offset is compensated after compensating for the static DC offset component. The dynamic DC offset compensator does not have an element for storing the magnitude of the static DC offset.

3 Claims, 15 Drawing Sheets

| MSB | | | | LSB | Amount of compensation current |
|---|---|---|---|---|---|
| 0 | 0 | 0 | 0 | 0 | ±0 |
| 0 | 0 | 0 | 0 | 1 | 1× |
| 0 | 0 | 0 | 1 | 0 | 2× |
| 0 | 0 | 0 | 1 | 1 | 3× |
| 0 | 0 | 1 | 0 | 0 | 4× |
| 0 | 0 | 1 | 0 | 1 | 5× |
| 0 | 0 | 1 | 1 | 0 | 6× |
| 0 | 0 | 1 | 1 | 1 | 7× |
| 0 | 1 | 0 | 0 | 0 | 8× |
| 0 | 1 | 0 | 0 | 1 | 9× |
| 0 | 1 | 0 | 1 | 0 | 10× |
| 0 | 1 | 0 | 1 | 1 | 11× |
| 0 | 1 | 1 | 0 | 0 | 12× |
| 0 | 1 | 1 | 0 | 1 | 13× |
| 0 | 1 | 1 | 1 | 0 | 14× |
| 0 | 1 | 1 | 1 | 1 | 15× |
| 1 | 0 | 0 | 0 | 0 | 16× |
| 1 | 0 | 0 | 0 | 1 | 17× |
| 1 | 0 | 0 | 1 | 0 | 18× |
| 1 | 0 | 0 | 1 | 1 | 19× |
| 1 | 0 | 1 | 0 | 0 | 20× |
| 1 | 0 | 1 | 0 | 1 | 21× |
| 1 | 0 | 1 | 1 | 0 | 22× |
| 1 | 0 | 1 | 1 | 1 | 23× |
| 1 | 1 | 0 | 0 | 0 | 24× |
| 1 | 1 | 0 | 0 | 1 | 25× |
| 1 | 1 | 0 | 1 | 0 | 26× |
| 1 | 1 | 0 | 1 | 1 | 27× |
| 1 | 1 | 1 | 0 | 0 | 28× |
| 1 | 1 | 1 | 0 | 1 | 29× |
| 1 | 1 | 1 | 1 | 0 | 30× |
| 1 | 1 | 1 | 1 | 1 | 31× |

FIG. 20
PRIOR ART

DIRECT CONVERSION RECEIVER WITH DC OFFSET COMPENSATION

FIELD OF THE INVENTION

The present invention relates to a direct conversion receiver having the function of compensating for a DC offset that occurs when an interfering wave is input. In particular, the present invention relates to a direct conversion receiver with an improved calibration system for the DC offset compensation.

BACKGROUND OF THE INVENTION

Technologies using a direct conversion system have been proposed with recent progress in reducing the size and cost of a radio receiver. This system directly converts an RF input signal into a low-frequency baseband signal, and therefore is advantageous, e.g., in eliminating an intermediate frequency filter as compared to a conventional system that requires the intermediate frequency.

A frequency conversion is performed by mixing an RF input signal and a local signal whose frequency is equal to that of the RF input signal. In the direct conversion system, however, if there is second order nonlinear distortion in a mixer, and the input signal level is high, a DC offset occurs in the output baseband signal. This case will be described in detail by referring to FIGS. 10 and 11. FIG. 10 shows the spectrum of the RF input signal. Reference numeral 61 denotes a weak-level desired signal that has a center frequency equal to a local signal frequency $f_{LO}$. Reference numeral 62 denotes a high-level interfering signal that has a frequency $f_{INT}$ higher than the local signal frequency $f_{LO}$.

When the RF input signal including such a high-level interfering signal is input to the mixer, the output signal of the mixer has a spectrum as shown in FIG. 11. Reference numerals 63, 64 denote components of the mixer output after the frequency conversion of the desired signal 61 and the interfering signal 62 of the RF input signal, respectively. Reference numeral 65 denotes a DC offset caused by the high-level interfering signal in the presence of second order nonlinear distortion of the mixer.

In the direct conversion system, the DC offset 65 occurs within the band of the desired signal 63 of the mixer output, and thus reduces the reception sensitivity. If the mixer is composed of a differential circuit, and the differential balance is perfectly symmetrical, the second order nonlinear distortion is not present. Actually, however, the elements constituting the differential circuit cannot have perfect symmetry due to manufacturing variations. Therefore, it is not possible to eliminate the second order nonlinear distortion.

On the other hand, in the direct conversion system, leakage of the local signal frequency $f_{LO}$ into the RF input terminal may result in self-mixing of the mixer. The self-mixing also causes a DC offset in the mixer output, even if the input signal level is low. This case will be described in detail by referring to FIGS. 12 and 13. FIG. 12 shows the spectrum of the RF input signal. Reference numeral 66 denotes a spectrum that indicates the leakage of the local signal frequency $f_{LO}$ into the RF input terminal. When the local signal 66 that has leaked into the RF input terminal is input to the mixer, the output signal of the mixer has a spectrum as shown in FIG. 13. Reference numerals 67, 68 denote spectrums obtained by the frequency conversion using the local signal frequency $f_{LO}$: 67 is a DC offset, and 68 is a signal having a frequency of $2 \times f_{LO}$.

In the direct conversion system, the DC offset 67 occurs due to self-mixing within the band of the desired signal of the mixer output, and thus reduces the reception sensitivity. Because of the asymmetry of a layout of the mixer or the parasitic components of devices constituting the mixer, the self-mixing cannot be removed completely. Therefore, it is not possible to make the DC offset zero in the mixer output.

The low-frequency baseband signal output from the mixer enters a baseband block. The baseband block includes a filter that attenuates the interfering wave other than the desired signal at the RF input terminal, and an amplifier that can vary the gain for maintaining the amplitude of the baseband signal constant at the output terminal of the baseband block, regardless of the magnitude of the input signal from the RF input terminal. However, neither the filter nor the differential circuit of the amplifier can have perfect symmetry due to manufacturing variations. Therefore, a DC offset also occurs in the baseband block. Consequently, the DC offset that has occurred in the mixer output by self-mixing and has been multiplied by the gain of the amplifier is combined with the DC offset that has occurred in the baseband block, and then is output from the output terminal of the baseband block.

As described above, two types of DC offsets are problems for a direct conversion receiver and are categorized as: a DC offset that varies depending on the RF input signal; and a DC offset that is kept constant regardless of the RF input signal. The former can be referred to as "dynamic DC offset", and the latter can be referred to as "static DC offset".

Conventionally, techniques of compensating both for the dynamic DC offset and the static DC offset have been proposed.

U.S. Pat. No. 6,535,725 discloses a method for compensating for a dynamic DC offset that occurs in the output of a mixer by detecting an interfering signal included in an RF input signal. First, this method will be described by referring to FIG. 14.

In FIG. 14, a mixer 73 includes a switching cell 71 and an RF input cell 72. In the RF input cell 72, an RF input signal is input from RF input terminals 83, 84 and amplified. In the switching cell 71, the amplified RF signal is mixed with a local signal that is input from local input terminals 81, 82, and thus is converted into an IF signal. The IF signal is output from output terminals 79, 80. The direct conversion system also is called "zero IF system", since the center frequency of the IF signal is at DC.

The switching cell 71 includes bipolar transistors Q1, Q2, Q3, and Q4. If all the transistors have exactly the same properties, the balance of a differential circuit is perfectly symmetrical. However, the properties of the individual transistors Q1, Q2, Q3 and Q4 deviate from the ideal properties due to manufacturing variations. Therefore, second order nonlinear distortion may occur during the conversion of the RF input signal into the IF signal. This leads to a DC offset in the mixer output, as shown in FIG. 11. As is well known, the DC offset is proportional to the square of the input signal strength. Accordingly, the DC offset of the mixer output is increased as the level of the interfering wave included in the input signal becomes higher.

A DC offset compensator 78 includes a detector 76, a controller 75, a correction generator 74, and a user interface 77. The detector 76 detects the RF input signal and outputs a detection signal. The controller 75 generates a control signal in accordance with the detection signal. The correction generator 74 generates a correction signal in accordance with the control signal of the controller 75 so as to reduce the DC offset at the output terminals 79, 80 of the mixer 73. The operation of the DC offset compensator 78 allows the correction signal of the correction generator 74 to change with the strength of the RF signal input to the mixer 73, thereby compensating for the DC offset of the mixer output. The second order nonlinear distortion of the mixer 73 is caused by manufacturing variations and differs in characteristics individually. Thus, the DC offset compensator 78 further has the function of adjusting the control signal of the controller 75 with the user interface 77.

Next, a method for compensating for the static DC offset that occurs at the output terminal of a baseband block will be described by referring to FIG. 15. FIG. 15 shows the basic configuration of a conventional DC offset calibration system.

In FIG. 15, reference numeral 1 denotes an RF amplifier composed of a LNA (low noise amplifier) for amplifying a high-frequency signal, 2 denotes a mixer for converting an RF input signal into a low-frequency baseband signal, and 3 denotes a local signal generator. A local signal that has leaked into RF input terminals 16, 17 is amplified by the RF amplifier 1, combined with a local signal that has leaked into mixer input terminals 20, 21, and appears at the mixer input terminals 20, 21 as represented by 66 in FIG. 12. This local signal appearing at the mixer input terminals 20, 21 is mixed with a local signal that has a frequency of $f_{LO}$ and is generated from output terminals 22, 23 of the local signal generator 3, so that the frequency is converted, and the DC offset 67 as shown in FIG. 13 occurs at output terminals 24, 25 of the mixer 2.

In FIG. 15, reference numeral 4 denotes a baseband block that includes a LPF (low-pass filter) 5 for attenuating an interfering signal and an AMP 6. The AMP 6 has a variable gain function for maintaining the magnitude of the baseband signal constant, regardless of the magnitude of the RF input signal from the RF input terminals 16, 17. The DC offset 67 and the $2 \times f_{LO}$ component 68 caused by self-mixing (FIG. 13) are output from the output terminals 24, 25 of the mixer 2 and input to the LPF 5. Then, the $2 \times f_{LO}$ component 68 is attenuated fully. The DC offset 67 appears at output terminals 26, 27 of the LPF 5, is amplified by the AMP 6, and appears at baseband output terminals 28, 29. Because of the asymmetry of a differential circuit of the baseband block 4, a DC offset also occurs in the baseband block 4. Consequently, the DC offset caused by self-mixing and the DC offset that occurred in the baseband block 4 are combined and output from the baseband output terminals 28, 29.

In FIG. 15, a static DC offset compensator 7 includes a comparator 8, a successive approximation register (referred to as "SAR" in the following) 9, and a D/A converter (referred to as "DAC" in the following) 10a. The comparator 8 is used to discriminate the polarity of the DC offset at the baseband output terminals 28, 29. The SAR 9 compares the output signal of the comparator 8 with the polarity of the initial discrimination and outputs zero if the polarity is changed, and outputs 1 if the polarity is unchanged. The DAC 10a converts the digital signal output from the SAR 9 into an analog signal.

The comparator 8 and the SAR 9 constitute a successive approximation A/D converter. The DC offset that occurs in the baseband output is an analog signal, and therefore is converted into a digital signal by the successive approximation A/D converter. The converted digital signal is returned to an analog signal by the DAC 10a. The signal of the baseband output terminals 28, 29 is supplied to the input of the static DC offset compensator 7, and the output of the static DC offset compensator 7 is supplied to the output terminals 24, 25 of the mixer 2, thus forming a feedback loop. The static DC offset compensator 7 supplies a compensation current to the output terminals 24, 25 of the mixer 2 so as to compensate for the DC offset appearing at the baseband output terminals 28, 29.

Referring to FIGS. 16 to 20, the operation of the static DC offset compensator 7 and the process of compensating for the static DC offset will be described in detail, while taking the DAC 10a with 5 bits as an example.

FIG. 16 is a flowchart for explaining the operation of the static DC offset compensator 7.

FIG. 17 shows the relationship between a compensation current flowing into the output terminals 24, 25 (FIG. 15) of the mixer and the amount of a DC offset that occurs for the compensation current. The horizontal axis indicates the magnitude of the compensation current, and the vertical axis indicates the amount of the DC offset appearing at the baseband output terminals 28, 29. In FIG. 17, a line 71 represents the relationship between the amounts of the compensation current and the DC offset when an initial DC offset is output in the positive direction, and a line 72 represents the relationship between the amounts of the compensation current and the DC offset when an initial DC offset is output in the negative direction. The static DC offset compensator 7 switches the polarity of the compensation current in accordance with the polarity of the initial DC offset. For both the lines 71 and 72, the DC offset at the baseband output terminals 28, 29 becomes smaller as the absolute value of the compensation current is increased from the origin on the horizontal axis. Thus, the static DC offset has the characteristics that the amount of the DC offset that occurs in the baseband output is reduced with an increase in the absolute value of the compensation current. Therefore, the DC offset at the baseband output terminals 28, 29 can be adjusted by adjusting the absolute value of the compensation current in accordance with the polarity of the DC offset occurred.

FIGS. 18 and 19 show the process of adjusting the DC offset and correspond to FIG. 17. The vertical axis indicates the amount of the DC offset appearing at the baseband output terminals 28, 29, and the horizontal axis indicates time. FIG. 20 is a read table for each bit of the DAC 10a. The output of the DAC 10a is set so that the compensation current is increased monotonically from LSB to MSB.

The process of adjusting the DC offset when the initial DC offset is output in the positive direction as represented by the line 71 in FIG. 17 will be described below.

In FIG. 16, the static DC offset compensator 7 starts operating in the step S1. In the step S2, all the bits of the DAC 10a are set to zero, so that the read value of the DAC 10a is 00000, and no compensation current is output from the DAC 10a. Therefore, a DC offset in the initial state that corresponds to a time t10 of the line 71 in FIG. 17 occurs at the baseband output terminals 28, 29. The adjustment is performed to reduce this value. Subsequently, in the step S3, the comparator 8 detects the initial DC offset. In the step S4, MSB of the DAC 10a is set to 1 by the SAR 9, and the DAC 10a outputs a compensation current in accordance with 10000. Thus, a DC offset corresponding to a time t11 of the line 71 in FIG. 17 occurs.

Next, in the step S5, the comparator 8 detects the present DC offset. In the step S6, the SAR 9 compares the initial DC offset with the present DC offset, i.e., the DC offset at the time t10 with the DC offset at the time t11 of the line 71 in FIG. 17. Both the output values at t10 and t11 are positive, and thus not inverted. Then, in the step S8, the SAR 9 determines whether the bit is LSB or not. Since the result is NO, the SAR 9 sets the next bit to 1 in the step S9, and the DAC 10a is set at 11000. The DAC 10a outputs a compensation current in accordance with 11000, and a DC offset corresponding to a time t12 of the line 71 in FIG. 17 occurs.

Again, in the step S5, the comparator 8 detects the present DC offset. In the step S6, the SAR 9 compares the initial DC offset with the present DC offset, i.e., the DC offset at the time t10 with the DC offset at the time t12. As shown in FIG. 17, both the output values at t10 and t12 are positive and thus not inverted. Then, in the step S8, the SAR 9 determines whether the bit is LSB or not. Since the result is NO, the SAR 9 sets the next bit to 1 in the step S9, and the DAC 10a is set at 11100. The DAC 10a outputs a compensation current in accordance with 11100, and a DC offset corresponding to a time t13 of the line 71 in FIG. 17 occurs.

Again, in the step S5, the comparator 8 detects the present DC offset. In the step S6, the SAR 9 compares the initial DC offset with the present DC offset, i.e., the DC offset at the time t10 with the DC offset at the time t13. As shown in FIG. 17, the output values at t10 and t13 are inverted. Therefore, in the step S7, the present bit is returned to zero, and 11000 is read from the SAR 9. Then, in the step S8, the SAR 9 determines whether the bit is LSB or not. Since the result is NO, the SAR 9 sets the next bit to 1 in the step S9, and the DAC 10a is set at 11010. The DAC 10a outputs a compensation current in accordance with 11010, and a DC offset corresponding to a time t14 of the line 71 in FIG. 17 occurs.

Again, in the step S5, the comparator 8 detects the present DC offset. In the step S6, the SAR 9 compares the initial DC offset with the present DC offset, i.e., the DC offset at the time t10 with the DC offset at the time t14. As shown in FIG. 17, the output values at t10 and t14 are inverted. Therefore, in the step S7, the present bit is returned to zero, and 11000 is read from the SAR 9. Then, in the step S8, the SAR 9 determines whether the bit is LSB or not. Since the result is NO, the SAR 9 sets the next bit to 1 in the step S9, and the DAC 10a is set at 11001. The DAC 10a outputs a compensation current in accordance with 11001, and a DC offset corresponding to a time t15 of the line 71 in FIG. 17 occurs.

Again, in the step S5, the comparator 8 detects the present DC offset. In the step S6, the SAR 9 compares the initial DC offset with the present DC offset, i.e., the DC offset at the time t10 with the DC offset at the time t15. As shown in FIG. 17, both the output values at t10 and t15 are positive and thus not inverted. Then, in the step S8, the SAR 9 determines whether the bit is LSB or not. Since the result is YES, 11001 is stored in the DAC 10a. In the step S10, the operation is END, and the DC offset compensation is finished.

The above operation can be summarized in FIG. 18. The initial DC offset at t10 is approximated successively during the time from t11 to t15 and compensated in the direction of decreasing the DC offset. At t16, the DC offset compensation is finished with the storage of 11001 in the DAC 10a, and the static DC offset that is output in the positive direction at the baseband output terminals 28, 29 can be compensated.

Next, the process of adjusting the DC offset when the initial DC offset is output in the negative direction as represented by the line 72 in FIG. 17 will be described below.

In FIG. 16, the static DC offset compensator 7 starts operating in the step S1. In the step S2, all the bits of the DAC 10a are set to zero, so that the read value of the DAC 10a is 00000, and no compensation current is output from the DAC 10a. Therefore, a DC offset in the initial state that corresponds to a time t20 of the line 72 in FIG. 17 occurs at the baseband output terminals 28, 29. The adjustment is performed to reduce this value. Subsequently, in the step S3, the comparator 8 detects the initial DC offset. In the step S4, MSB of the DAC 10a is set to 1 by the SAR 9, and the DAC 10a outputs a compensation current in accordance with 10000. Thus, a DC offset corresponding to a time t21 of the line 72 in FIG. 17 occurs.

Next, in the step S5, the comparator 8 detects the present DC offset. In the step S6, the SAR 9 compares the initial DC offset with the present DC offset, i.e., the DC offset at the time t20 with the DC offset at the time t21. As shown in FIG. 17, both the output values at t20 and t21 are negative and thus not inverted. Then, in the step S8, the SAR 9 determines whether the bit is LSB or not. Since the result is NO, the SAR 9 sets the next bit to 1 in the step S9, and the DAC 10a is set at 11000. The DAC 10a outputs a compensation current in accordance with 11000, and a DC offset corresponding to a time t22 of the line 72 in FIG. 17 occurs.

Again, in the step S5, the comparator 8 detects the present DC offset. In the step S6, the SAR 9 compares the initial DC offset with the present DC offset, i.e., the DC offset at the time t20 with the DC offset at the time t22. As shown in FIG. 17, the output values at t20 and t22 are inverted. Therefore, in the step S7, the present bit is returned to zero, and 10000 is read from the SAR 9. Then, in the step S8, the SAR 9 determines whether the bit is LSB or not. Since the result is NO, the SAR 9 sets the next bit to 1 in the step S9, and the DAC 10a is set at 10100. The DAC 10a outputs a compensation current in accordance with 10100, and a DC offset corresponding to a time t23 of the line 72 in FIG. 17 occurs.

Again, in the step S5, the comparator 8 detects the present DC offset. In the step S6, the SAR 9 compares the initial DC offset with the present DC offset, i.e., the DC offset at the time t20 with the DC offset at the time t23. As shown in FIG. 17, both the output values at t20 and t23 are negative and thus not inverted. Then, in the step S8, the SAR 9 determines whether the bit is LSB or not. Since the result is NO, the SAR 9 sets the next bit to 1 in the step S9, and the DAC 10a is set at 10110. The DAC 10a outputs a compensation current in accordance with 10110, and a DC offset corresponding to a time t24 of the line 72 in FIG. 17 occurs.

Again, in the step S5, the comparator 8 detects the present DC offset. In the step S6, the SAR 9 compares the initial DC offset with the present DC offset, i.e., the DC offset at the time t20 with the DC offset at the time t24. As shown in FIG. 17, both the output values at t20 and t24 are negative and thus not inverted. Then, in the step S8, the SAR 9 determines whether the bit is LSB or not. Since the result is NO, the SAR 9 sets the next bit to 1 in the step S9, and the DAC 10a is set at 10111. The DAC 10a outputs a compensation current in accordance with 10111, and a DC offset corresponding to a time t25 of the line 72 in FIG. 17 occurs.

Again, in the step S5, the comparator 8 detects the present DC offset. In the step S6, the SAR 9 compares the initial DC offset with the present DC offset, i.e., the DC offset at the time t20 with the DC offset at the time t25. As shown in FIG. 17, the output values at t20 and t25 are inverted. Therefore, in the step S7, the present bit is returned to zero, and 10110 is read from the SAR 9. Then, in the step S8, the SAR 9 determines whether the bit is LSB or not. Since the result is YES, 10110 is stored in the DAC 10a. In the step S10, the operation is END, and the DC offset compensation is finished.

The above operation for adjusting the DC offset as represented by the line 72 in FIG. 17 can be summarized in FIG. 19. The initial DC offset at t20 is approximated successively during the time from t21 to t25 and compensated in the direction of decreasing the DC offset. At t26, the DC offset compensation is finished with the storage of 10110 in the DAC 10a, and the static DC offset that is output in the negative direction at the baseband output terminals 28, 29 can be compensated.

However, when the RF input signal in FIG. 10 is input to the mixer, the actual output of the mixer includes, as shown in FIG. 21, a desired signal 63 converted by the mixer, an interfering signal 64 resulting from the conversion of a high-level interfering signal by the mixer, a dynamic DC offset 65, a static DC offset 67, and a $2 \times f_{LO}$ signal 68 converted by the mixer due to self-mixing. Therefore, if the configuration in FIG. 14 is used, the dynamic DC offset 65 has to be compensated in the following manner. First, the magnitude of the static DC offset 67 is stored, and then the magnitude of the dynamic DC offset 65 is detected as the amount by which the DC offset is changed from the static DC offset 67. Therefore, this configuration requires a means for temporally storing the magnitude of the static DC offset 67. Moreover, a radio receiver employing a direct conversion system also should have a means for compensating for the static DC offset, so that the system becomes larger and more complicated.

SUMMARY OF THE INVENTION

Therefore, with the foregoing in mind, it is an object of the present invention to provide a direct conversion receiver that can compensate for a dynamic DC offset regardless of the magnitude of a static DC offset and can eliminate the element for storing the static DC offset.

A direct conversion receiver of the present invention includes a mixer for converting an RF input signal into a low-frequency baseband signal by mixing the RF signal and a local signal, a dynamic DC offset compensator for compensating for a dynamic DC offset caused by the effect of second order nonlinear distortion of the mixer on an interfering wave that enters input terminals of the mixer, and a static DC offset compensator for compensating for a static DC offset caused by self-mixing of a local signal and a leakage component of the local signal that appears at the input terminals of the mixer.

To achieve the above object, the direct conversion receiver of the present invention is characterized as follows: the static DC offset compensator starts compensating for the static DC offset at a first time t1 after the DC offset compensation operation has started, the static DC offset compensation is finished at a second time t2, and then the dynamic DC offset compensator starts compensating for the dynamic DC offset, and the dynamic DC offset compensation is finished at a third time t3, thereby compensating for only a change in DC offset due to the dynamic DC offset after compensation of the static DC offset component; and the dynamic DC offset compensator does not have an element for storing the magnitude of the static DC offset.

BRIEF DESCRIPTION OF THE DRAWINGS

FIG. 20 is a bit allocation table for a compensation current of a DAC.

DETAILED DESCRIPTION OF THE INVENTION

Figure 1:
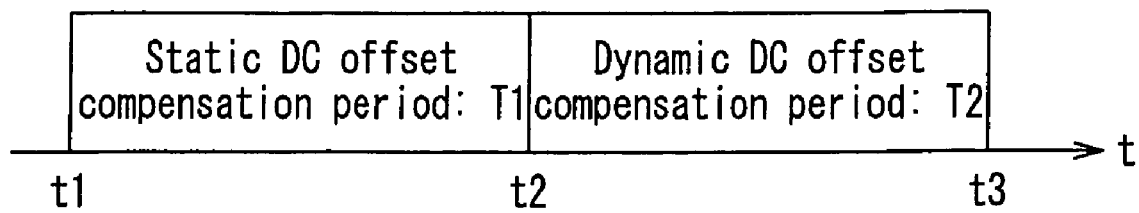
FIG. 1 is a timing chart showing the operation concept of a DC offset calibration system in Embodiment 1.

The direct conversion receiver of the present invention may include the following: an RF amplifier composed of a low noise amplifier for amplifying an RF signal; a local signal generator for generating a local signal; the mixer for converting the RF signal output from the RF amplifier into a low-frequency baseband signal by mixing the RF signal and the local signal; a baseband block including a LPF for attenuating an interfering wave and a variable gain amplifier, wherein the interfering wave is removed from the RF signal, and the magnitude of the baseband signal is maintained constant regardless of the magnitude of the RF signal; a successive approximation A/D converter including a comparator and a successive approximation register (referred to as "SAR" in the following), wherein the comparator detects polarity of a DC offset appearing at output terminals of the baseband block, and the SAR compares an output of the comparator with the polarity of initial discrimination and outputs zero if the polarity is changed, and outputs 1 if the polarity is unchanged; a first D/A converter for outputting a compensation current corresponding to a digital signal output from the SAR and supplying it as a compensation signal to output terminals of the mixer; a second D/A converter for outputting a compensation current corresponding to a digital signal output from the SAR; a detector for detecting magnitude of the RF signal entering the mixer; a controller for controlling a value of the second D/A converter in accordance with the magnitude of an output of the detector and generating a compensation current for the mixer; and a test signal generator for generating a test signal that causes the dynamic DC offset to occur at the output terminals of the mixer and supplying the test signal to output terminals of the RF amplifier.

The static DC offset compensator is composed of the successive approximation A/D converter and the first D/A converter, and compensates for the static DC offset at the output terminals of the baseband block. The dynamic DC offset compensator is composed of the successive approximation A/D converter, the second D/A converter, the detector, and the controller, and compensates for the dynamic DC offset in the mixer. The dynamic DC offset and the static DC offset are compensated in a time-division manner, so that the successive approximation A/D converter can be shared between the static DC offset compensator and the dynamic DC offset compensator.

Another direct conversion receiver of the present invention has a multiband function for two different bands, i.e., a first RF band and a second RF band. Therefore, the direct conversion receiver includes the following: a first RF amplifier composed of a low noise amplifier for amplifying an RF signal in the first RF band; a second RF amplifier composed of a low noise amplifier for amplifying an RF signal in the second RF band that differs from the first RF band; a local signal generator for generating a local signal in the first RF band and a local signal in the second RF band; a first mixer for converting the RF signal output from the first RF amplifier into a low-frequency baseband signal by mixing the RF signal and the local signal in the first RF band; a second mixer for converting the RF signal output from the second RF amplifier into a low-frequency baseband signal by mixing the RF signal and the local signal in the second RF band; a baseband block including a LPF for attenuating an interfering wave and a variable gain amplifier, to which output signals from the first mixer and the second mixer are supplied, wherein the interfering wave is removed from each of the RF signal in the first RF band and the RF signal in the second RF band, and the magnitude of the baseband signal is maintained constant regardless of the magnitude of the RF signal in the first RF band and the RF signal in the second RF band; a successive approximation A/D converter including a comparator and a successive approximation register (referred to as "SAR" in the following), wherein the comparator detects polarity of a DC offset appearing at output terminals of the baseband block, and the SAR compares an output of the comparator with the polarity of initial discrimination and outputs zero if the polarity is changed, and outputs 1 if the polarity is unchanged; a first D/A converter for outputting a compensation current corresponding to a digital signal output from the SAR and supplying it as a compensation signal to output terminals of the first mixer and the second mixer; a second D/A converter for outputting a compensation current corresponding to a digital signal output from the SAR; a first detector for detecting magnitude of the RF signal entering the first mixer; a first controller for controlling a value of the second D/A converter in accordance with the magnitude of an output of the first detector and generating a compensation current for the second mixer; a third D/A converter for outputting a compensation current corresponding to a digital signal output from the SAR; a second detector for detecting magnitude of the RF signal entering the second mixer; a second controller for controlling a value of the third D/A converter in accordance with the magnitude of an output of the second detector and generating a compensation current for the second mixer; and a test signal generator for generating test signals that cause the dynamic DC offset of the first RF band and the dynamic DC offset of the second RF band to occur at the output terminals of the first mixer and the second mixer and supplying the test signals to output terminals of the first RF amplifier and the second RF amplifier, respectively.

The successive approximation A/D converter and the first D/A converter constitute a static DC offset compensator that compensates for the static DC offsets of the first RF band and the second RF band at the output terminals of the baseband block. The successive approximation A/D converter, the second D/A converter, the first detector, and the first controller constitute a first dynamic DC offset compensator that compensates for the dynamic DC offset of the first RF band in the first mixer. The successive approximation A/D converter, the third D/A converter, the second detector, and the second controller constitute a second dynamic DC offset compensator that compensates for the dynamic DC offset of the second RF band in the second mixer.

The static DC offset compensator starts compensating for the static DC offset of the first RF band at a first time t1 after the DC offset compensation operation has started. The static DC offset compensation in the first RF band is finished at a second time t2, and then the first dynamic DC offset compensator starts compensating for the dynamic DC offset of the first RF band. The dynamic DC offset compensation in the first RF band is finished at a third time t3, and then the static DC offset compensator starts compensating for the static DC offset of the second RF band. The static DC offset compensation in the second RF band is finished at a fourth time t4, and then the second dynamic DC offset compensator starts compensating for the dynamic DC offset of the second RF band. The dynamic DC offset compensation in the second RF band is finished at a fifth time t5. The dynamic DC offset and the static DC offset in each of the RF bands are compensated in a time-division manner, and the dynamic DC offset of the second RF band is compensated after compensating for the dynamic DC offset of the first RF band, so that the successive approximation A/D converter is shared between the static DC offset compensator and the first and second dynamic DC offset compensators.

Hereinafter, the present invention will be described by way of illustrative embodiments with reference to the drawings.

Embodiment 1

A DC offset calibration system of a direct conversion receiver in Embodiment 1 of the present invention will be described by referring to the drawings.

FIG. 1 shows the basic concept of the present invention. In FIG. 1, t1 denotes a time when static DC offset compensation starts, t2 denotes a time when the static DC compensation ends and dynamic DC offset compensation starts, and t3 denotes a time when the dynamic DC offset compensation ends. The static DC offset is compensated in a period T1 from the time t1 to the time t2. The dynamic DC offset is compensated in a period T2 from the time t2 to the time t3. This configuration can compensate for the dynamic DC offset regardless of the magnitude of the static DC offset. Therefore, an element that stores the static DC offset to compensate for the dynamic DC offset is not necessary.

This will be described in detail by referring to the block diagram of FIG. 2 and the timing chart of FIG. 3.

Figure 2:
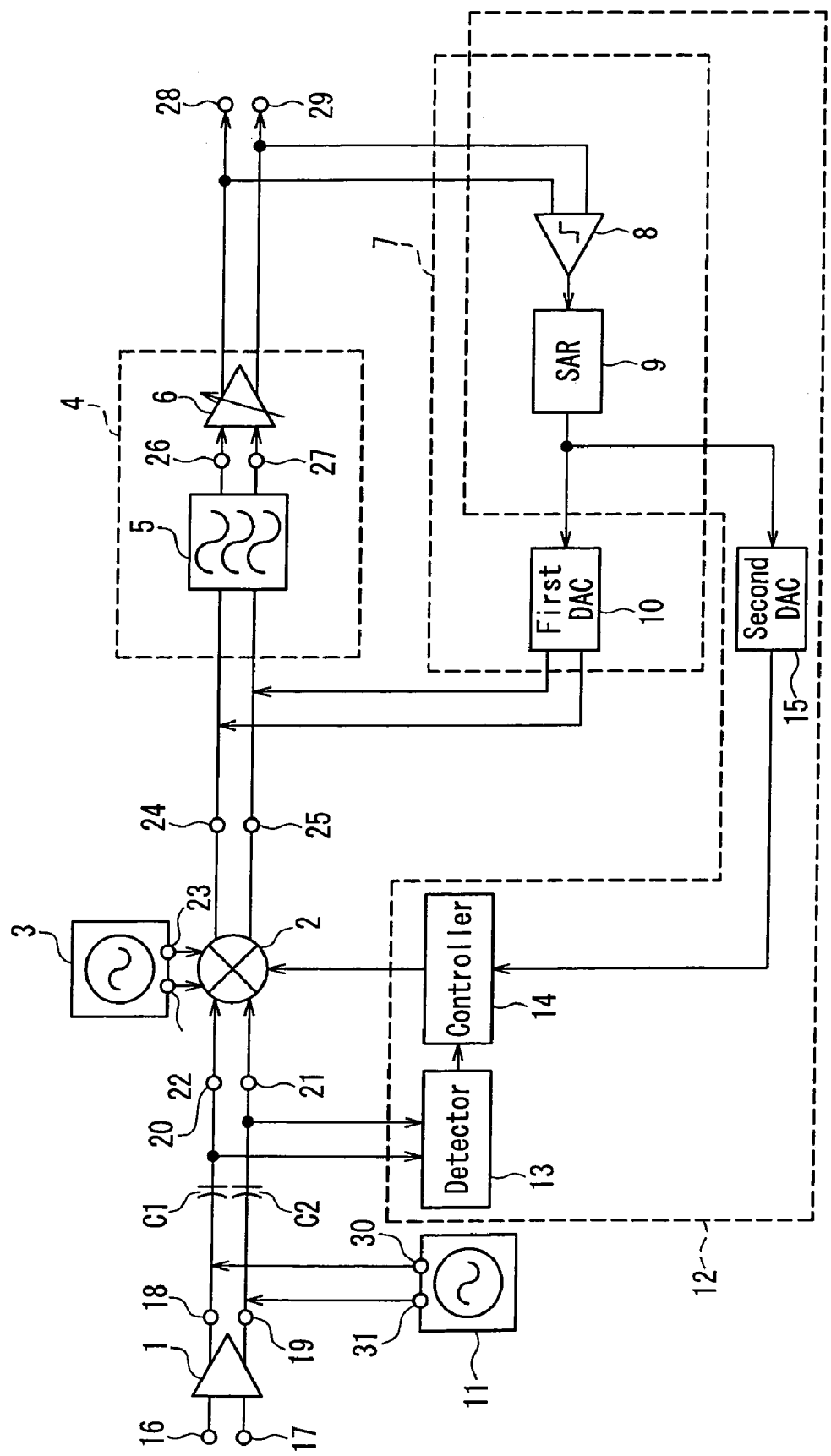
FIG. 2 is a block diagram showing the basic configuration of a direct conversion receiver with the DC offset calibration system.

FIG. 2 is a block diagram showing the basic configuration of the direct conversion receiver of this embodiment. An RF amplifier 1 is composed of a LNA (low noise amplifier) for amplifying a high-frequency signal, and amplifies an RF signal input from RF input terminals 16, 17. The output of the RF amplifier 1 is input to a mixer 2, mixed with a local signal, and converted into a low-frequency baseband signal. The local signal is generated by a local signal generator 3 and supplied to the mixer 2 from local signal output terminals 22, 23.

A baseband block 4 includes a LPF 5 for attenuating an interfering signal and an AMP 6 having a variable gain function for amplifying the baseband signal. The baseband signal appearing at output terminals 24, 25 of the mixer 2 is input to the LPF 5. After the interfering wave is attenuated by the LPF 5, the baseband signal is input to the AMP 6. The AMP 6 maintains the baseband signal constant regardless of the magnitude of the RF signal entering the RF input terminals 16, 17. Then, the baseband signal is output from baseband output terminals 28, 29.

A static DC offset compensator 7 has the function of compensating for the static DC offset and includes a comparator 8, a SAR 9, and a first DAC 10. The comparator 8 is used to discriminate the polarity of the DC offset at the baseband output terminals 28, 29. The SAR (successive approximation register) 9 compares the output signal of the comparator 8 with the polarity of the initial discrimination and outputs zero if the polarity is changed, and outputs 1 if the polarity is unchanged. The first DAC 10 converts the digital signal output from the SAR 9 into an analog signal.

The comparator 8 and the SAR 9 constitute a successive approximation A/D converter. The DC offset that occurs in the baseband output is an analog signal, and therefore is converted into a digital signal by the successive approximation A/D converter. The converted signal is returned to an analog signal by the first DAC 10. The signal of the baseband output terminals 28, 29 is supplied to the input of the static DC offset compensator 7, and the output of the static DC offset compensator 7 is supplied to the output terminals 24, 25 of the mixer 2, thus forming a feedback loop. The static DC offset compensator 7 supplies a compensation current to the output terminals 24, 25 of the mixer 2 so as to compensate for the static DC offset appearing at the baseband output terminals 28, 29.

For dynamic DC offset compensation, a test signal generator 11 supplies a test signal by assuming an interfering wave that may enter the RF input terminals 16, 17 and causes a dynamic DC offset to occur in the mixer 2. The test signal generator 11 is used to detect the dynamic DC offset that occurs in the mixer 2. Therefore, output terminals 30, 31 of the test signal generator 11 are connected to output terminals 18, 19 of the RF amplifier 1.

A dynamic DC offset compensator 12 has the function of compensating for the dynamic DC offset and includes the comparator 8, the SAR 9, a second DAC 15, a detector 13, and a controller 14. The comparator 8 and the SAR 9 are shared between the static DC offset compensator 7 and the dynamic DC offset compensator 12. The second DAC 15 converts the digital signal output from the SAR 9 into an analog signal. The detector 13 detects the magnitude of the RF signal at input terminals 20, 21 of the mixer 2. Therefore, while the test signal generator 11 is operated, the detector 13 detects the magnitude of the test signal from the test signal output terminals 30, 31. The controller 14 controls the value of a compensation signal of the second DAC 15 in accordance with the magnitude of the detection signal of the detector 13, and generates a compensation current for the mixer 2. The control ratio of the controller 14 to the value of the compensation signal of the second DAC 15 is set based on the outputs of the detector 13 and the dynamic DC offset compensator 12 when the test signal generator 11 is operated.

The comparator 8 and the SAR 9 constitute the successive approximation A/D converter. The DC offset that occurs in the baseband output is an analog signal, and therefore is converted into a digital signal by the successive approximation A/D converter. The converted signal is returned to an analog signal by the second DAC 15.

The signal of the baseband output terminals 28, 29 is supplied to the input of the dynamic DC offset compensator 12, and the output of the dynamic DC offset compensator 12 is supplied to the mixer 2, thus forming a feedback loop. The dynamic DC offset that has occurred in the mixer 2 due to the output of the test signal generator 11 appears at the baseband output terminals 28, 29 and is input to the dynamic DC offset compensator 12. The operation of the dynamic DC offset compensator 12 controls the mixer 2 so as to compensate for the dynamic DC offset appearing at the baseband output terminals 28, 29.

Figure 3:
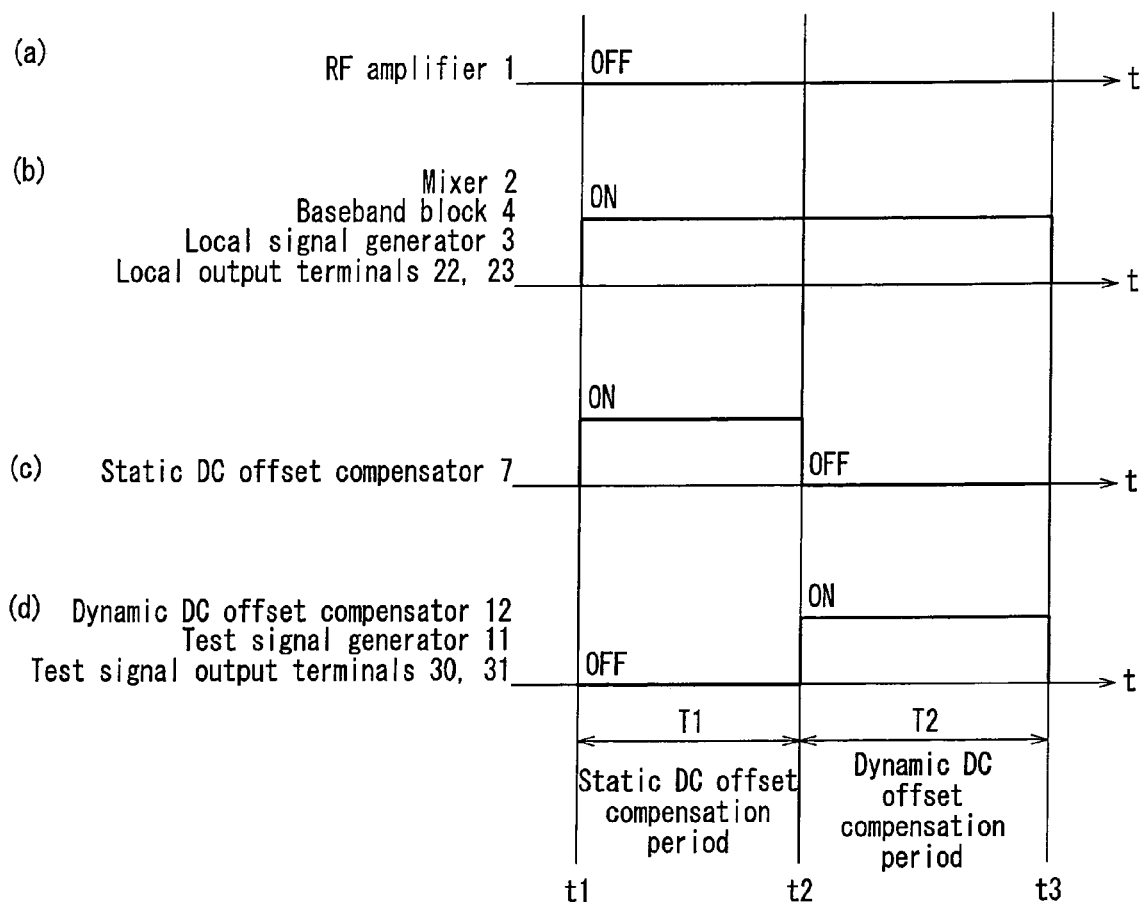
FIG. 3 is a timing chart for explaining the operation of the DC offset calibration system.

In FIG. 3, t1 denotes a time when static DC offset compensation starts, t2 denotes a time when the static DC compensation ends and dynamic DC offset compensation starts, and t3 denotes a time when the dynamic DC offset compensation ends. The static DC offset is compensated in a period T1 from the time t1 to the time t2. The dynamic DC offset is compensated in a period T2 from the time t2 to the time t3.

First, the static DC offset compensation starts at t1. At this time, as shown in (b) and (c) of FIG. 3, the mixer 2, the baseband block 4, the local signal generator 3, the local outputs 22, 23, and the static DC offset compensator 7 are ON. As shown in (a) and (d) of FIG. 3, the RF amplifier 1, the dynamic DC offset compensator 12, the test signal generator 11, and the test signal outputs 30, 31 are OFF.

Figure 12:
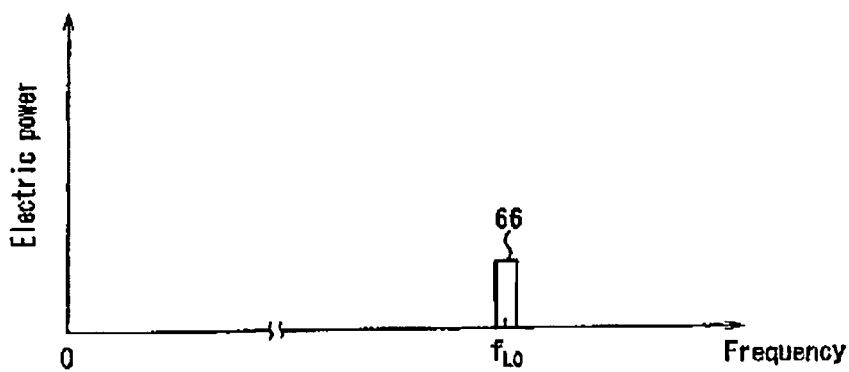
FIG. 12 shows a spectrum of a signal appearing at an RF input terminal when an RF input signal is small.
Figure 13:
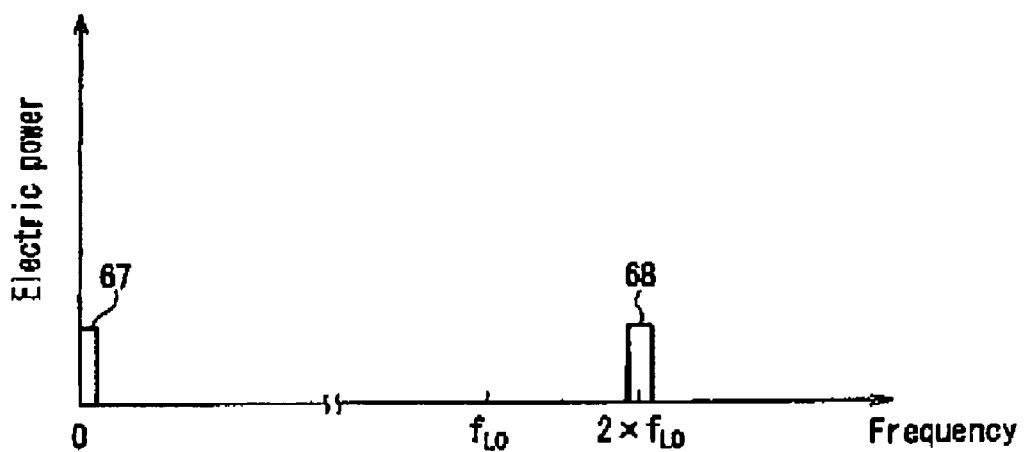
FIG. 13 shows a spectrum when an RF input signal is small, and a DC offset that occurs in the mixer output is not compensated.
Figure 14:
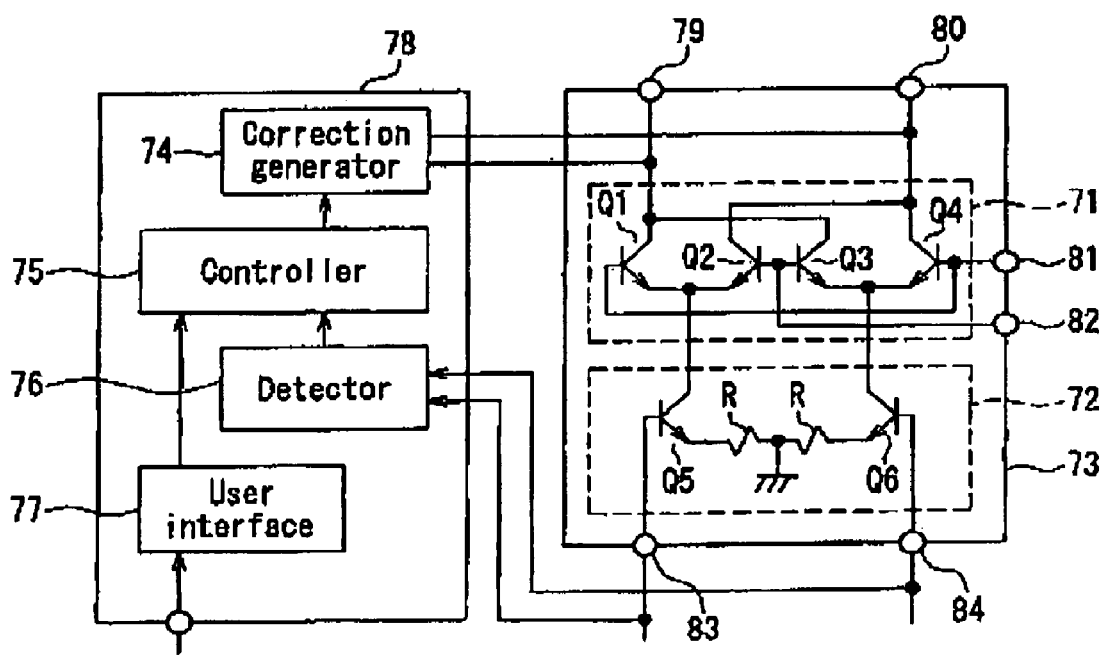
FIG. 14 is a circuit diagram showing the specific configuration of a conventional DC offset calibration system for compensating for a dynamic DC offset.

When the local signal 66 having a frequency of $f_{LO}$ (FIG. 12) leaks into the input terminals 20, 21 of the mixer 2, it is mixed with a local signal that has a frequency of $f_{LO}$ and is generated from the output terminals 22, 23 of the local signal generator 3, so that the frequency is converted. The static DC offset 67 and the $2 \times f_{LO}$ component 68 (FIG. 13) caused by self-mixing occur at the output terminals 24, 25 of the mixer 2. In this case, the test signal from the test signal output terminals 30, 31 is OFF, and therefore a dynamic DC offset does not occur in the mixer 2. The static DC offset 67 and the $2 \times f_{LO}$ component 68 of the mixer output are input to the baseband block 4, and the $2 \times f_{LO}$ component 68 is attenuated fully by the LPF 5. The static DC offset 67 is amplified by the AMP 6, combined with a static DC offset that occurs in the baseband block 4, and provided to the baseband output terminals 28, 29.

Figure 15:
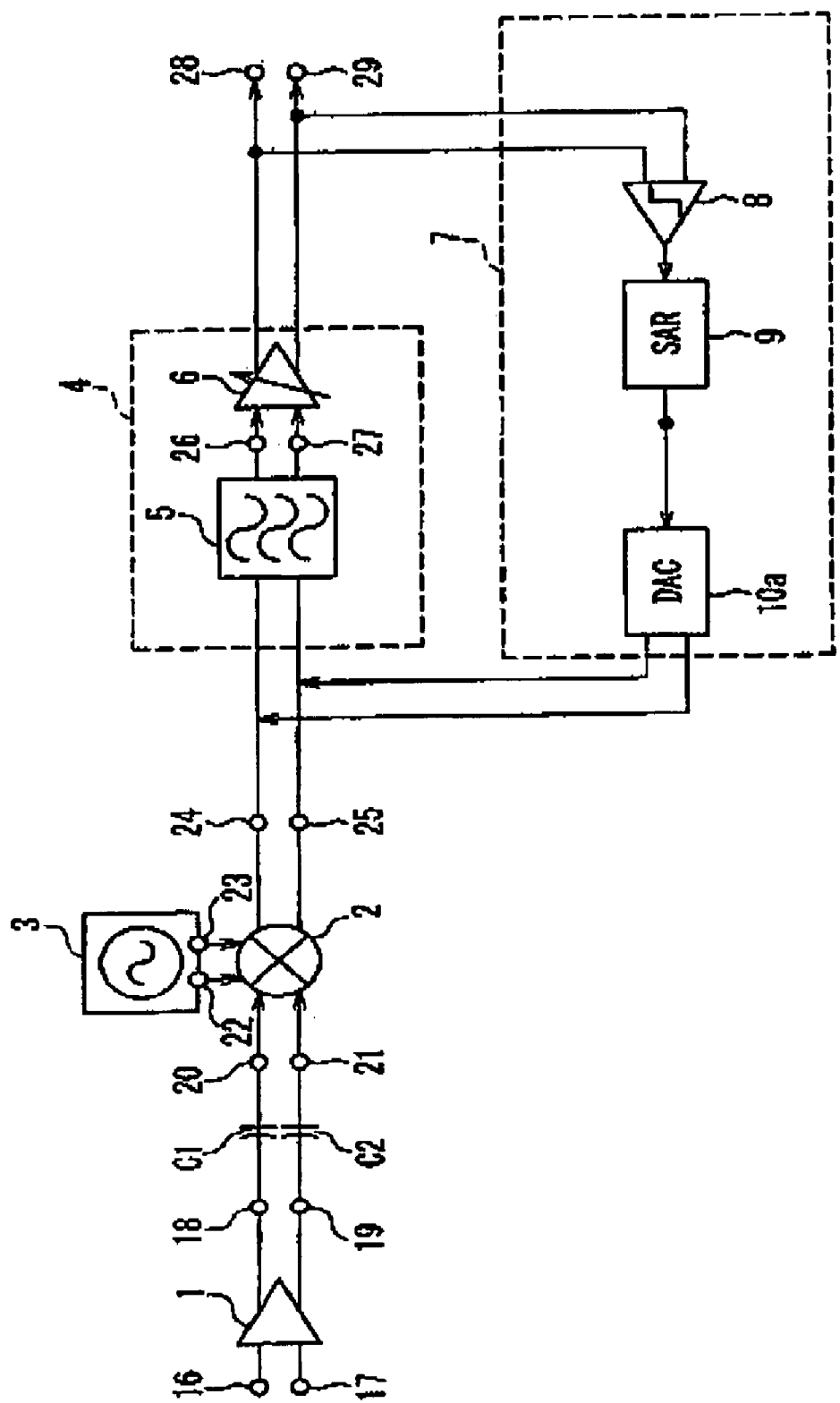
FIG. 15 is a block diagram showing the basic configuration of a conventional direct conversion receiver with a DC offset calibration system for compensating for a static DC offset.

The static DC offset appearing at the baseband output terminals 28, 29 is compensated by the operation of the static DC offset compensator 7 during the period T1, and the static DC offset compensation is finished at t2. The operation of the static DC offset compensator 7 is substantially the same as the operation (FIG. 16) of the static DC offset compensator 7 in the conventional example (FIG. 15).

Next, the dynamic DC offset compensation starts at t2. At this time, as shown in (c) of FIG. 3, the static DC offset compensator 7 is OFF. As shown in (d) of FIG. 3, the dynamic DC offset compensator 12, the test signal generator 11, and the test signal outputs 30, 31 are ON.

Figure 10:
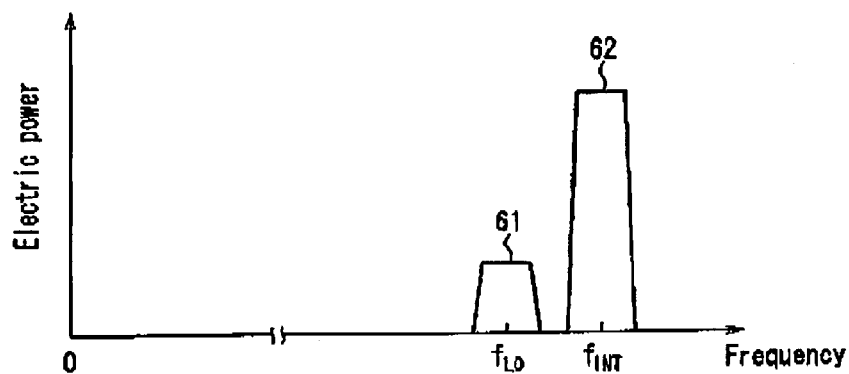
FIG. 10 shows a spectrum of a signal entering a mixer when an RF input signal is large.
Figure 11:
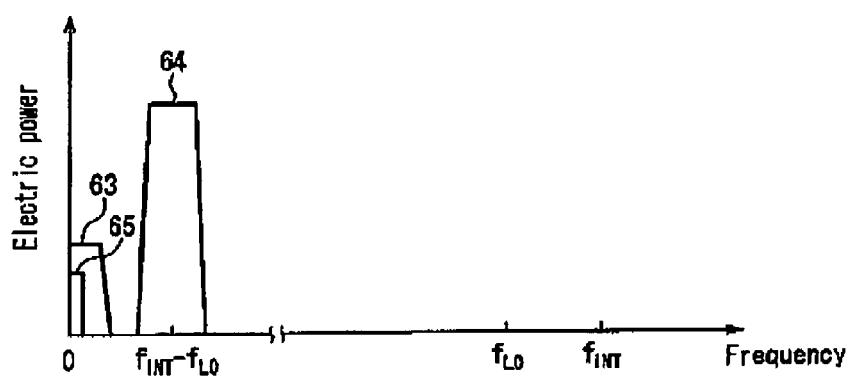
FIG. 11 shows a spectrum when an RF input signal is large, and a DC offset that occurs in the mixer output is not compensated.

The test signal generator 11 generates a test signal that corresponds to the high-level interfering signal 62 with a frequency of $f_{INT}$ (FIG. 10). The test signal entering the output terminals 18, 19 of the RF amplifier 1 is input to the input terminals 20, 21 of the mixer 2, and then is mixed with a local signal that has a frequency of $f_{LO}$ and is generated from the local signal generator 3, so that the frequency is converted. The dynamic DC offset 65 (FIG. 11) caused by second order nonlinear distortion of the mixer 2 and the interfering signal 64 (FIG. 11) caused by the frequency conversion of the test signal using the local signal frequency $f_{LO}$ occur at the output terminals 24, 25 of the mixer 2. The dynamic DC offset 65 and the interfering signal 64 of the mixer output are input to the baseband block 4, and the interfering signal 64 is attenuated fully by the LPF 5. The dynamic DC offset 65 is amplified by the AMP 6 and appears at the baseband output terminals 28, 29. The dynamic DC offset appearing at the baseband output terminals 28, 29 is compensated by the operation of the dynamic DC offset compensator 12 during the period T2, and the dynamic DC offset compensation is finished at t3.

Therefore, at t3, the dynamic DC offset can be compensated at the baseband output terminals 28, 29, regardless of the magnitude of the static DC offset. Thus, an element that stores the static DC offset to compensate for the dynamic DC offset is not necessary.

Referring to FIGS. 16, 4 to 6, and 20, the operation of the dynamic DC offset compensator 12 and the process of compensating for the dynamic DC offset will be described in detail, while taking the second DAC 15 with 5 bits as an example.

Figure 16:
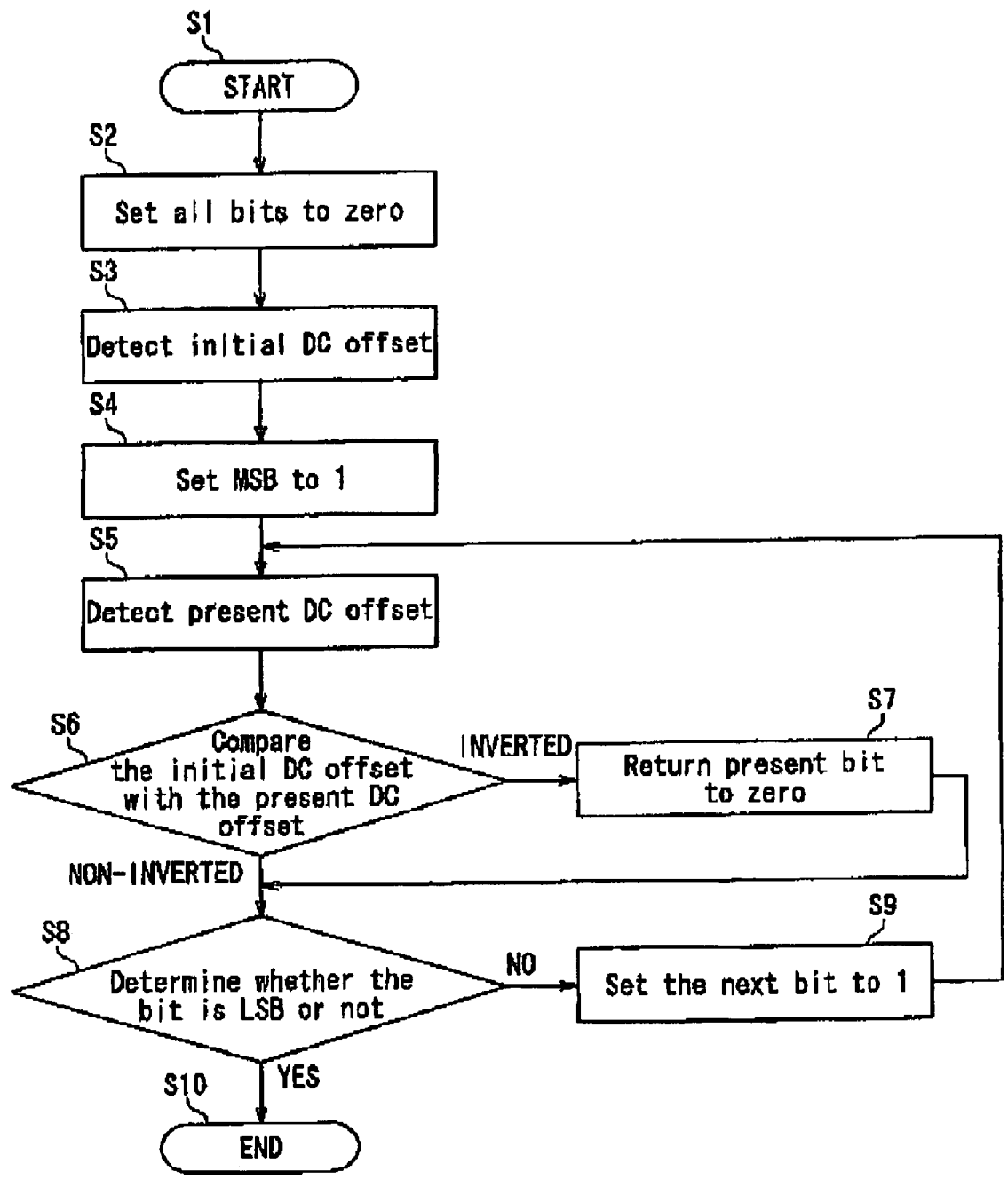
FIG. 16 is a flowchart for explaining the operation of a DC offset compensator in a DC offset calibration system.
Figure 17:
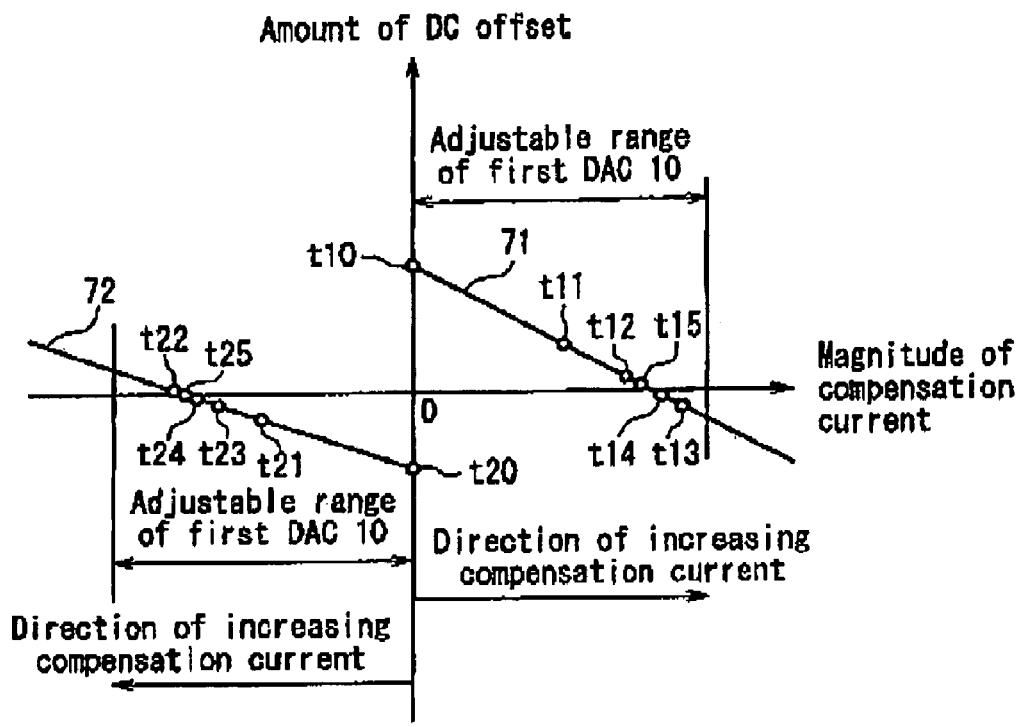
FIG. 17 shows the relationship between a static DC offset that occurs in baseband output and a compensation current.
Figure 18:
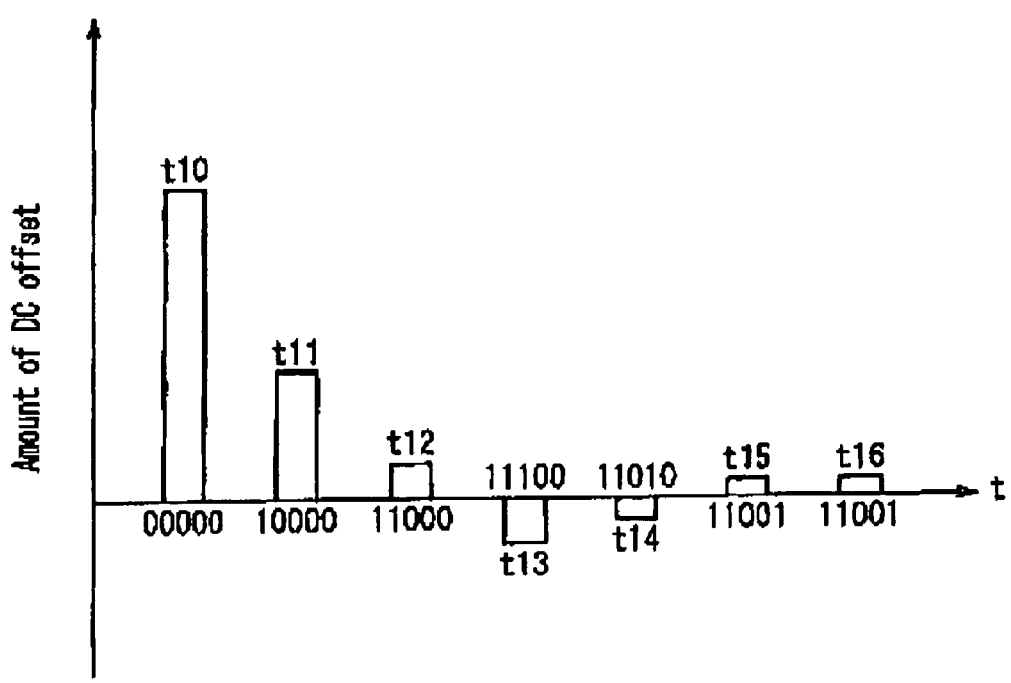
FIG. 18 is a graph for explaining the process of compensating for a DC offset that is output in a positive direction in a conventional DC offset calibration system.
Figure 19:
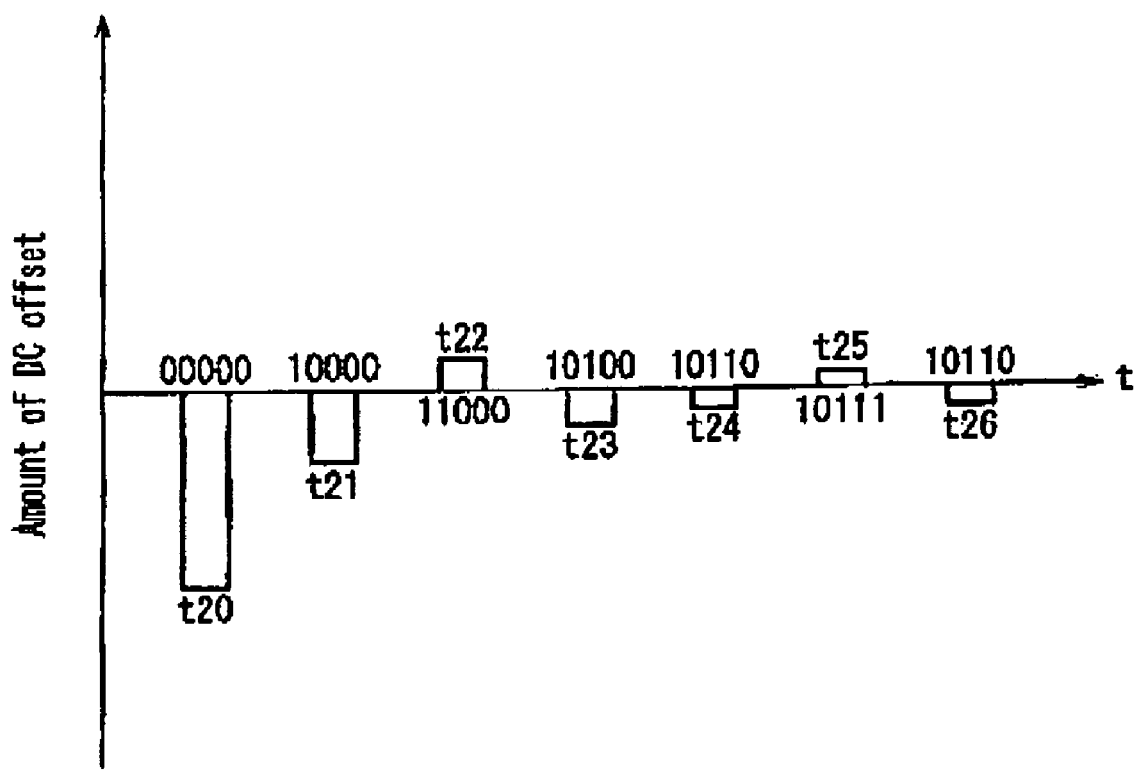
FIG. 19 is a graph fro explaining the process of compensating for a DC offset that is output in a positive direction in the conventional DC offset calibration system.
Figure 21:
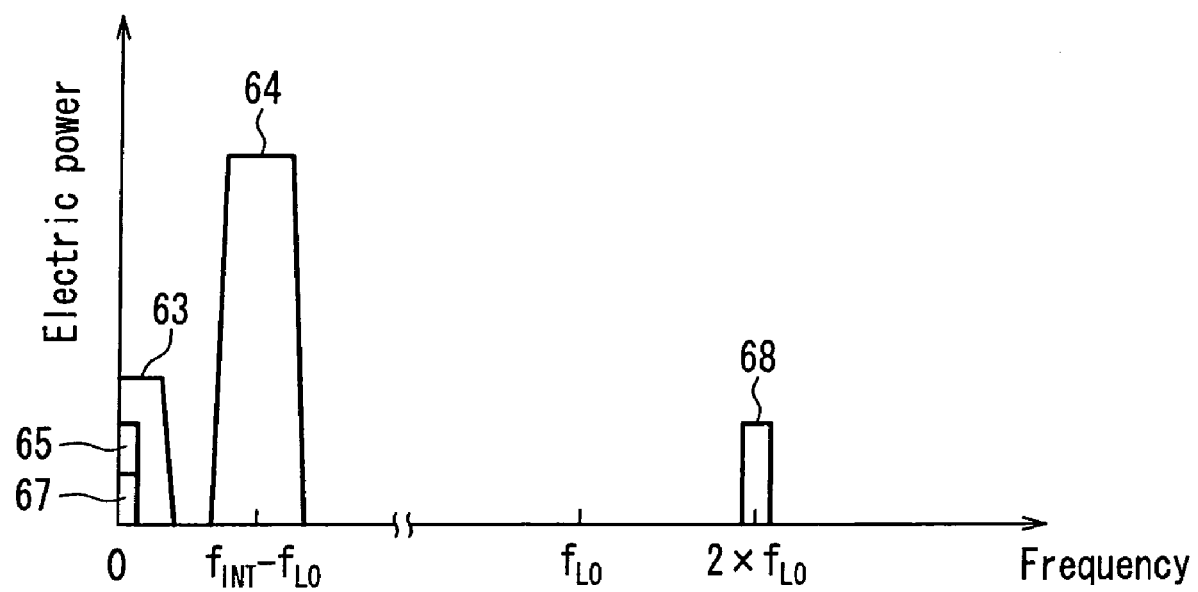
FIG. 21 shows a spectrum when an RF input signal is large, and a DC offset that occurs in the actual mixer output is not compensated.

The operation of the dynamic DC offset compensator 12 is substantially the same as that of the static DC offset compensator 7 in FIG. 16. Therefore, the following explanation of the operation of the dynamic DC offset compensator 12 refers to FIG. 16.

Figure 4:
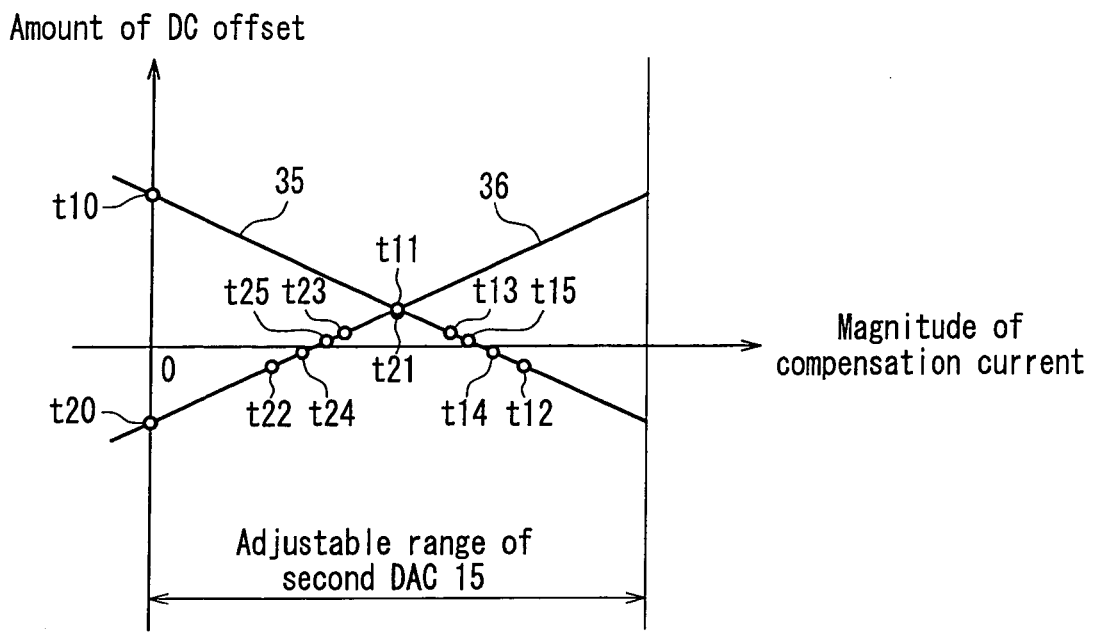
FIG. 4 shows the relationship between a dynamic DC offset that occurs in the baseband output of the DC offset calibration system and a compensation current.

FIG. 4 shows the relationship between a compensation current from the controller 14 and the amount of a DC offset that occurs for the compensation current. The horizontal axis indicates the magnitude of the compensation current, and the vertical axis indicates the amount of the DC offset appearing at the baseband output terminals 28, 29. In FIG. 4, a line 35 represents the relationship between the amounts of the compensation current of the controller 14 and the DC offset when an initial DC offset is output in the positive direction, and a line 36 represents the relationship between the amounts of the compensation current of the controller 14 and the DC offset when an initial DC offset is output in the negative direction. As shown in FIG. 4, there are two types of dynamic DC offsets according to individual variations of the mixer 2: a dynamic DC offset that monotonically decreases with an increase in the compensation current (line 35); and a dynamic DC offset that monotonically increases with an increase in the compensation current (line 36). Thus, the dynamic DC offset at the baseband output terminals 28, 29 can be adjusted by discriminating the polarity of the initial DC offset and adjusting the magnitude of the compensation current.

Figure 5:
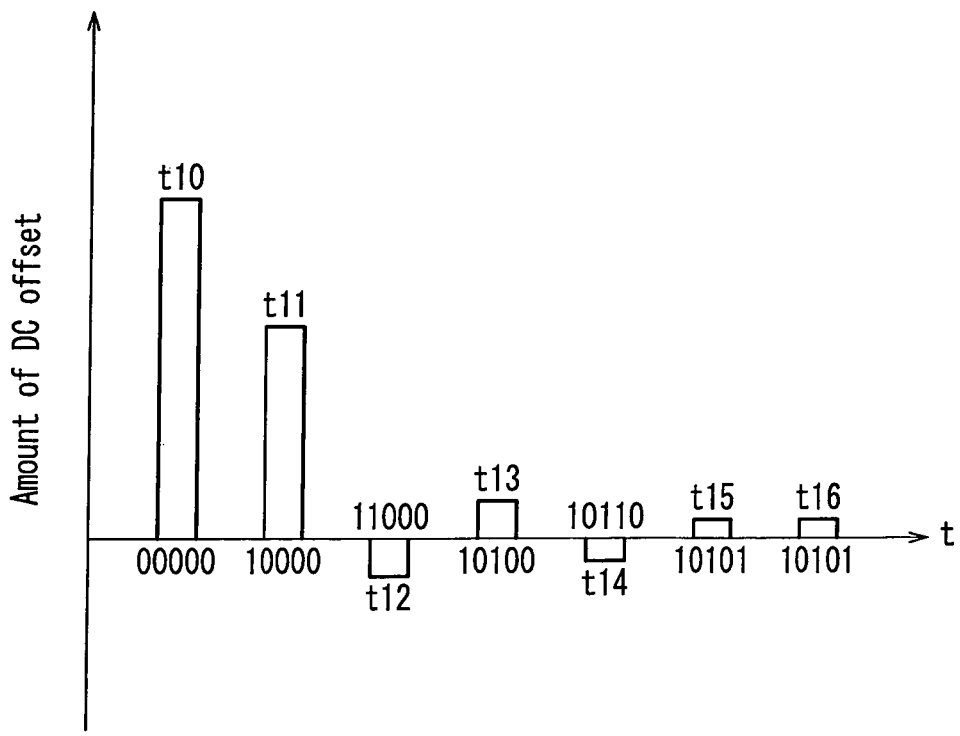
FIG. 5 is a graph for explaining the process of compensating for a dynamic DC offset that is output in a positive direction in the DC offset calibration system.
Figure 6:
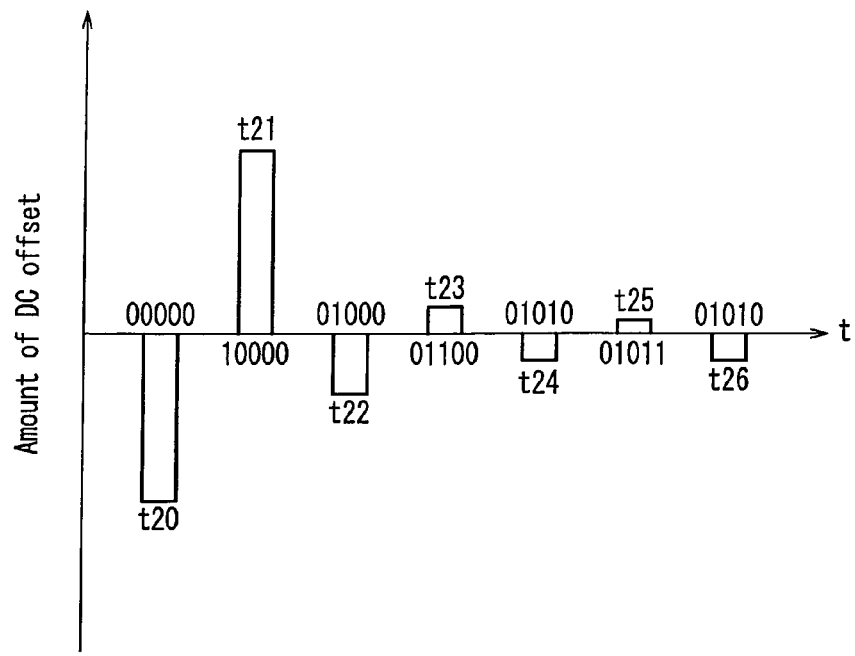
FIG. 6 is a graph for explaining the process of compensating for a static DC offset that is output in a negative direction in the DC offset calibration system.

FIGS. 5 and 6 show the process of adjusting the DC offset and corresponds to FIG. 4. The vertical axis indicates the amount of the DC offset appearing at the baseband output terminals 28, 29, and the horizontal axis indicates time.

Like the DAC 10a of the conventional example, the read table for each bit of the second DAC 15 is shown in FIG. 20. The output of the second DAC 15 is set so that the compensation current is increased monotonically from LSB to MSB.

The process of adjusting the dynamic DC offset when the initial dynamic DC offset is output in the positive direction as represented by the line 35 in FIG. 4 will be described below with reference to FIG. 16.

In FIG. 16, the dynamic DC offset compensator 12 starts operating in the step S1. In the step S2, all the bits of the second DAC 15 are set to zero, so that the output value of the second DAC 15 is 00000, and no compensation current is output from the second DAC 15. Therefore, a DC offset in the initial state that corresponds to a time t10 of the line 35 in FIG. 4 occurs at the baseband output terminals 28, 29. The adjustment is performed to reduce this value. Subsequently, in the step S3, the comparator 8 detects the initial DC offset. In the step S4, MSB of the second DAC 15 is set to 1 by the SAR 9, and the second DAC 15 outputs a compensation current in accordance with 10000. Thus, a DC offset corresponding to a time t11 of the line 35 in FIG. 4 occurs.

Next, in the step S5, the comparator 8 detects the present DC offset. In the step S6, the SAR 9 compares the initial DC offset with the present DC offset, i.e., the DC offset at the time t10 with the DC offset at the time t11. As shown in FIG. 4, both the output values at t10 and t11 are positive and thus not inverted. Then, in the step S8, the SAR 9 determines whether the bit is LSB or not. Since the result is NO, the SAR 9 sets the next bit to 1 in the step S9, and the second DAC 15 is set at 11000. The second DAC 15 outputs a compensation current in accordance with 11000, and a DC offset corresponding to a time t12 of the line 35 in FIG. 4 occurs.

Again, in the step S5, the comparator 8 detects the present DC offset. In the step S6, the SAR 9 compares the initial DC offset with the present DC offset, i.e., the DC offset at the time t10 with the DC offset at the time t12. As shown in FIG. 4, the output values at t10 and t12 are inverted. Therefore, in the step S7, the present bit is returned to zero, and 10000 is output from the SAR 9. Then, in the step S8, the SAR 9 determines whether the bit is LSB or not. Since the result is NO, the SAR 9 sets the next bit to 1 in the step S9, and the second DAC 15 is set at 10100. The second DAC 15 outputs a compensation current in accordance with 10100, and a DC offset corresponding to a time t13 of the line 35 in FIG. 4 occurs.

Again, in the step S5, the comparator 8 detects the present DC offset. In the step S6, the SAR 9 compares the initial DC offset with the present DC offset, i.e., the DC offset at the time t10 with the DC offset at the time t13. As shown in FIG. 4, both the output values at t10 and t13 are positive and thus not inverted. Then, in the step S8, the SAR 9 determines whether the bit is LSB or not. Since the result is NO, the SAR 9 sets the next bit to 1 in the step S9, and the second DAC 15 is set at 10110. The second DAC 15 outputs a compensation current in accordance with 10110, and a DC offset corresponding to a time t14 of the line 35 in FIG. 4 occurs.

Again, in the step S5, the comparator 8 detects the present DC offset. In the step S6, the SAR 9 compares the initial DC offset with the present DC offset, i.e., the DC offset at the time t10 with the DC offset at the time t14. As shown in FIG. 4, the output values at t10 and t14 are inverted. Therefore, in the step S7, the present bit is returned to zero, and 10100 is output from the SAR 9. Then, in the step S8, the SAR 9 determines whether the bit is LSB or not. Since the result is NO, the SAR 9 sets the next bit to 1 in the step S9, and the second DAC 15 is set at 10101. The second DAC 15 outputs a compensation current in accordance with 10101, and a DC offset corresponding to a time t15 of the line 35 in FIG. 4 occurs.

Again, in the step S5, the comparator 8 detects the present DC offset. In the step S6, the SAR 9 compares the initial DC offset with the present DC offset, i.e., the DC offset at the time t10 with the DC offset at the time t15. As shown in FIG. 4, both the output values at t10 and t15 are positive and thus not inverted. Then, in the step S8, the SAR 9 determines whether the bit is LSB or not. Since the result is YES, 10101 is stored in the second DAC 15. In the step S10, the operation is END, and the dynamic DC offset compensation is finished.

The above operation can be summarized in FIG. 5. The initial dynamic DC offset at t10 is approximated successively during the time from t11 to t15 and compensated in the direction of decreasing the DC offset. At t16, the dynamic DC offset compensation is finished with the storage of 10101 in the second DAC 15, and the dynamic DC offset that is output in the positive direction at the baseband output terminals 28, 29 can be compensated.

Next, the process of adjusting the dynamic DC offset when the initial dynamic DC offset is output in the negative direction as represented by the line 36 in FIG. 4 will be described below.

In FIG. 16, the dynamic DC offset compensator 12 starts operating in the step S1. In the step S2, all the bits of the second DAC 15 are set to zero, so that the read value of the second DAC 15 is 00000, and no compensation current is output from the second DAC 15. Therefore, a DC offset in the initial state that corresponds to a time t20 of the line 36 in FIG. 4 occurs at the baseband output terminals 28, 29. The adjustment is performed to reduce this value. Subsequently, in the step S3, the comparator 8 detects the initial DC offset. In the step S4, MSB of the second DAC 15 is set to 1 by the SAR 9, and the second DAC 15 outputs a compensation current in accordance with 10000. Thus, a DC offset corresponding to a time t21 of the line 36 in FIG. 4 occurs.

Next, in the step S5, the comparator 8 detects the present DC offset. In the step S6, the SAR 9 compares the initial DC offset with the present DC offset, i.e., the DC offset at the time t20 with the DC offset at the time t21. As shown in FIG. 4, the output values at t20 and t21 are inverted. Therefore, in the step S7, the present bit is returned to zero, and 00000 is output from the SAR 9. Then, in the step S8, the SAR 9 determines whether the bit is LSB or not. Since the result is NO, the SAR 9 sets the next bit to 1 in the step S9, and the second DAC 15 is set at 01000. The second DAC 15 outputs a compensation current in accordance with 01000, and a DC offset corresponding to a time t22 of the line 36 in FIG. 4 occurs.

Again, in the step S5, the comparator 8 detects the present DC offset. In the step S6, the SAR 9 compares the initial DC offset with the present DC offset, i.e., the DC offset at the time t20 with the DC offset at the time t22. As shown in FIG. 4, both the output values at t20 and t22 are negative and thus not inverted. Then, in the step S8, the SAR 9 determines whether the bit is LSB or not. Since the result is NO, the SAR 9 sets the next bit to 1 in the step S9, and the first DAC 10 is set at 01100. The second DAC 15 outputs a compensation current in accordance with 01100, and a DC offset corresponding to a time t23 of the line 36 in FIG. 4 occurs.

Again, in the step S5, the comparator 8 detects the present DC offset. In the step S6, the SAR 9 compares the initial DC offset with the present DC offset, i.e., the DC offset at the time t20 with the DC offset at the time t23. As shown in FIG. 4, the output values at t20 and t23 are inverted. Therefore, in the step S7, the present bit is returned to zero, and 01000 is output from the SAR 9. Then, in the step S8, the SAR 9 determines whether the bit is LSB or not. Since the result is NO, the SAR 9 sets the next bit to 1 in the step S9, and the second DAC 15 is set at 01010. The second DAC 15 outputs a compensation current in accordance with 01010, and a DC offset corresponding to a time t24 of the line 36 in FIG. 4 occurs.

Again, in the step S5, the comparator 8 detects the present DC offset. In the step S6, the SAR 9 compares the initial DC offset with the present DC offset, i.e., the DC offset at the time t20 with the DC offset at the time t24. As shown in FIG. 4, both the output values at t20 and t24 are negative and thus not inverted. Then, in the step S8, the SAR 9 determines whether the bit is LSB or not. Since the result is NO, the SAR 9 sets the next bit to 1 in the step S9, and the second DAC 15 is set at 01011. The second DAC 15 outputs a compensation current in accordance with 01011, and a DC offset corresponding to a time t25 of the line 36 in FIG. 4 occurs.

Again, in the step S5, the comparator 8 detects the present DC offset. In the step S6, the SAR 9 compares the initial DC offset with the present DC offset, i.e., the DC offset at the time t20 with the DC offset at the time t25. As shown in FIG. 4, the output values at t20 and t25 are inverted. Therefore, in the step S7, the present bit is returned to zero, and 01010 is output from the SAR 9. Then, in the step S8, the SAR 9 determines whether the bit is LSB or not. Since the result is YES, 01010 is stored in the second DAC 15. In the step S10, the operation is END, and the dynamic DC offset compensation is finished.

The above operation can be summarized in FIG. 6. The initial dynamic DC offset at t20 is approximated successively during the time from t21 to t25 and compensated in the direction of decreasing the DC offset. At t26, the dynamic DC offset compensation is finished with the storage of 01010 in the second DAC 15, and the dynamic DC offset that is output in the negative direction at the baseband output terminals 28, 29 can be compensated.

As described above, the procedure for the dynamic DC offset compensation is the same as that for the static DC offset compensation. Moreover, the dynamic DC offset and the static DC offset are compensated in a time-division manner, as shown in FIG. 1. Therefore, the successive approximation A/D converter including the comparator 8 and the SAR 9 can be shared between the static DC offset compensator 7 and the dynamic DC offset compensator 12, as shown in FIG. 2, so that the system can be simplified.

In this embodiment, the static DC offset compensation is performed when the dynamic DC offset compensation is performed. Therefore, the dynamic DC offset compensator does not need to have a means for storing the static DC offset. This can prevent the system from being large and complicated. Moreover, the dynamic DC offset and the static DC offset are compensated in a time-division manner, so that the static DC offset compensator and the dynamic DC offset compensator can share the A/D converter including the comparator that discriminates the polarity of the DC offset at the baseband output terminals and the SAR that compares the output of the comparator with the polarity of the initial discrimination and outputs zero if the polarity is changed, and outputs 1 if the polarity is unchanged. Accordingly, the system can be simplified.

Embodiment 2

A DC offset calibration system of a direct conversion receiver in Embodiment 2 of the present invention will be described in detail by referring to FIGS. 7 to 9. In this embodiment, a multiband radio receiver with two different bands (first and second RF bands) is used, and a dynamic DC offset is compensated in each of the bands. In this case, e.g., the first RF band is identified as a GSM 900 MHz band, and the second RF band is identified as a DCS1800 MHz band. The same elements as those of the DC offset calibration system in Embodiment 1 are denoted by the same reference numerals, and the explanation will not be repeated.

Figure 7:
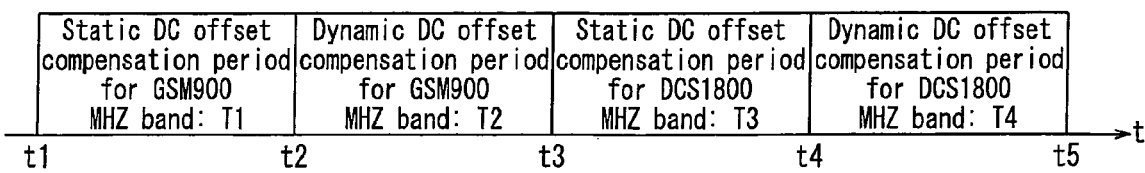
FIG. 7 is a timing chart showing the operation concept of a DC offset calibration system in Embodiment 2.
Figure 8:
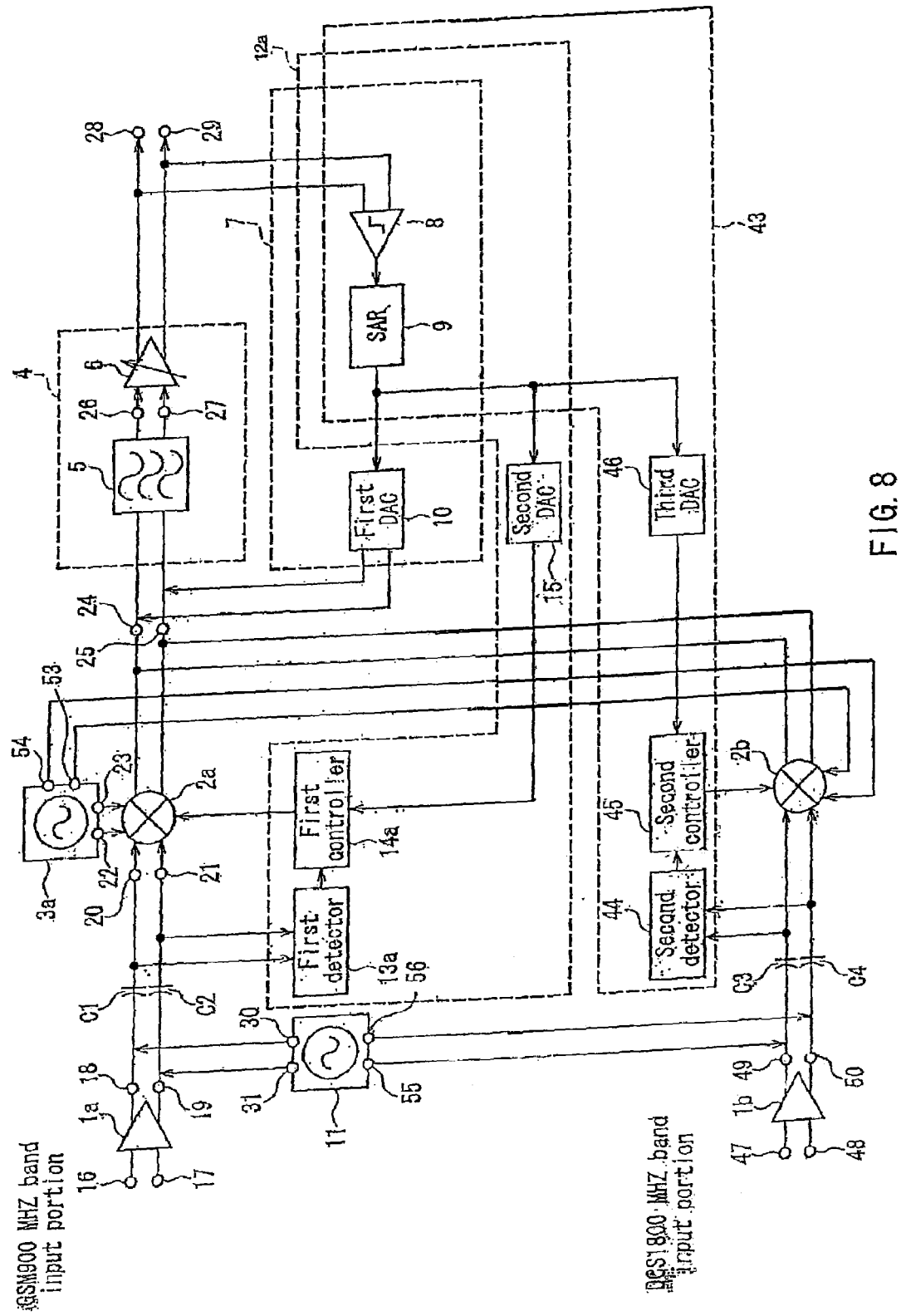
FIG. 8 is a block diagram showing the basic configuration of a direct conversion receiver with the DC offset calibration system in Embodiment 2.

In FIG. 7, t1 denotes a time when static DC offset compensation in the GSM900 MHz band starts, t2 denotes a time when the static DC offset compensation in the GSM900 MHz band ends and dynamic DC offset compensation in the GSM900 MHz band starts, t3 denotes a time when the dynamic DC offset compensation in the GSM900 MHz band ends and static DC offset compensation in the DCS1800 MHz band starts, t4 denotes a time when the static DC offset compensation in the DCS1800 MHz band ends and dynamic DC offset compensation in the DCS1800 MHz band starts, and t5 denotes a time when the dynamic DC offset compensation in the DCS1800 MHz band ends.

The static DC offset of the GSM900 MHz band is compensated in a period T1 from the time t1 to the time t2. The dynamic DC offset of the GSM900 MHz band is compensated in a period T2 from the time t2 to the time t3. The static DC offset of the DCS1800 MHz band is compensated in a period T3 from the time t3 to the time t4. The dynamic DC offset of the DCS1800 MHz band is compensated in a period T4 from the time t4 to the time t5. This configuration can compensate for the dynamic DC offset regardless of the magnitude of the static DC offset in each of the bands. Therefore, a means for compensating for the static DC offset is not required for each of the bands to compensate for the dynamic DC offset.

This will be described in more detail by referring to the block diagram of FIG. 8 and the timing chart of FIG. 9. In FIG. 8, a GSM900 MHz band RF signal is input to RF input terminals 16, 17. A first RF amplifier 1a composed of a LNA amplifies a high-frequency signal in the GSM900 MHz band. A local signal generator 3a has local signal output terminals 22, 23 for the GSM900 MHz band and local signal output terminals 53, 54 for the DCS1800 MHz band, and generates a local signal in each of the bands. A first mixer 2a mixes the GSM900 MHz band RF signal amplified by the first RF amplifier 1a and a local signal generated from the local signal output terminals 22, 23, so that the RF signal is converted into a low-frequency baseband signal.

Moreover, a DCS1800 MHz band RF signal is input to RF input terminals 47, 48. A second RF amplifier 1b composed of a LNA amplifies a high-frequency signal in the DCS1800 MHz band. A second mixer 2b mixes the DCS1800 MHz band RF signal amplified by the second RF amplifier 1b and a local signal generated from the local signal output terminals 53, 54, so that the RF signal is converted into a low-frequency baseband signal.

A baseband block 4 includes a LPF 5 for attenuating an interfering signal and an AMP 6 having a variable gain function for amplifying the baseband signal. The GSM900 MHz band baseband signal appearing at output terminals 24, 25 of the first mixer 2a, or the DCS1800 MHz band baseband signal appearing at output terminals 24, 25 of the second mixer 2b is input to the LPF 5, and the interfering wave is attenuated. The output of the LPF 5 is made constant by the AMP 6, regardless of the magnitude of the RF signal in each of the bands. Then, the baseband signal is output from baseband output terminals 28, 29.

A static DC offset compensator 7 has the function of compensating for the static DC offset in each of the bands. The static DC offset compensator 7 includes a comparator 8, a SAR 9, and a first DAC 10. The comparator 8 and the SAR 9 constitute a successive approximation A/D converter. The DC offset that occurs in the baseband output is an analog signal, and therefore is converted into a digital signal by the successive approximation A/D converter. The converted signal is returned to an analog signal by the first DAC 10. The static DC offset compensator 7 controls the output terminals 24, 25 of the first and second mixers 2a, 2b for each of the bands so as to compensate for the static DC offset appearing at the baseband output terminals 28, 29.

For dynamic DC offset compensation in each of the bands, a test signal generator 11 generates a test signal by assuming an interfering wave that may enter the RF input terminals 16, 17 and the RF input terminals 47, 48 and causes a dynamic DC offset to occur in the first mixer 2a and the second mixer 2b, respectively. To detect the dynamic DC offset that occurs in the first mixer 2a, output terminals 30, 31 of the test signal generator 11 are connected to output terminals 18, 19 of the first RF amplifier 1a. Similarly, to detect the dynamic DC offset that occurs in the second mixer 2b, output terminals 55, 56 of the test signal generator 11 are connected to output terminals 49, 50 of the second RF amplifier 1b.

A first dynamic DC offset compensator 12a has the function of compensating for the dynamic DC offset of the GSM900 MHz band. The first dynamic DC offset compensator 12 includes the comparator 8, the SAR 9, a second DAC 15, a first detector 13a, and a first controller 14a. The comparator 8 and the SAR 9 are shared between the static DC offset compensator 7 and the first dynamic DC offset compensators 12a. The first detector 13a detects the magnitude of the test signal from the test signal output terminals 30, 31. The first controller 14a controls the value of a compensation signal of the second DAC 15 in accordance with the magnitude of the detection signal of the first detector 13a, and generates a compensation current for the first mixer 2a.

The comparator 8 and the SAR 9 constitute the successive approximation A/D converter. The DC offset that occurs in the baseband output is an analog signal, and therefore is converted into a digital signal by the successive approximation A/D converter. The converted signal is returned to an analog signal by the second DAC 15. The first dynamic DC offset compensator 12a supplies a compensation current to the first mixer 2a so as to compensator for the dynamic DC offset of the GSM900 MHz band that occurs in the first mixer 2a.

A second dynamic DC offset compensator 43 has the function of compensating for the dynamic DC offset of the DCS1800 MHz band. The second dynamic DC offset compensator 43 includes the comparator 8, the SAR 9, a third DAC 46, a second detector 44, and a second controller 45. The comparator 8 and the SAR 9 are shared between the static DC offset compensator 7 and the second dynamic DC offset compensator 43. The third DAC 46 converts the digital signal output from the SAR 9 into an analog signal. The second detector 44 detects the magnitude of the test signal from the test signal output terminals 55, 56. The second controller 45 controls the value of a compensation signal of the third DAC 46 in accordance with the magnitude of the detection signal of the second detector 44, and generates a compensation current for the second mixer 2b.

The comparator 8 and the SAR 9 constitute the successive approximation A/D converter. The DC offset that occurs in the baseband output is an analog signal, and therefore is converted into a digital signal by the successive approximation A/D converter. The converted signal is returned to an analog signal by the third DAC 46. The second dynamic DC offset compensator 43 supplies a compensation current to the second mixer 2b so as to compensate for the dynamic DC offset of the DCS1800 MHz band that occurs in the second mixer 2b.

Figure 9:
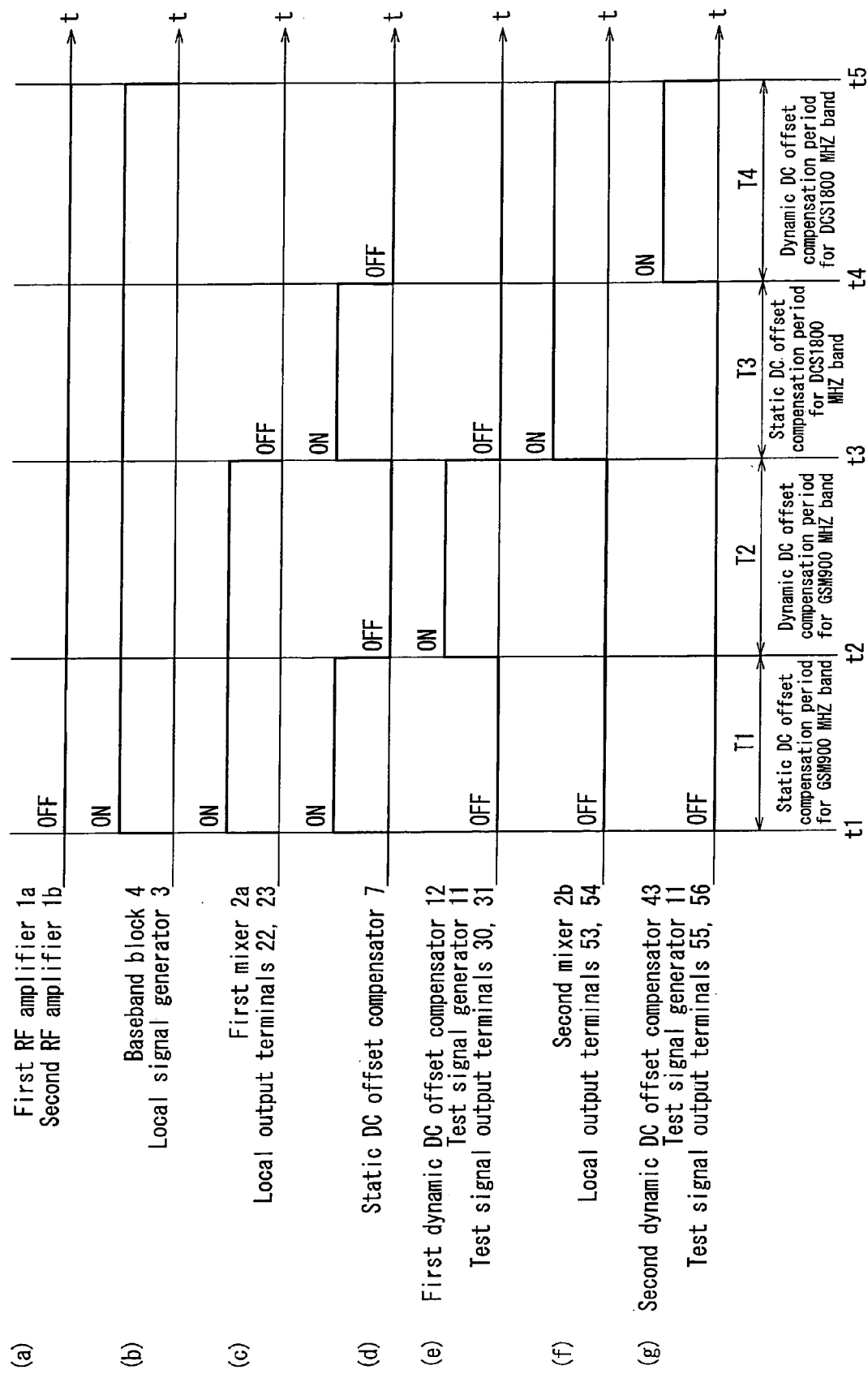
FIG. 9 is a timing chart for explaining the operation of the DC offset calibration system in Embodiment 2.

In FIG. 9, the time t1 to t5 and the periods T1 to T4 correspond to those shown in FIG. 7. First, the static DC offset compensation in the GSM900 MHz band starts at t1. At this time, as shown in (b), (c) and (d) of FIG. 9, the baseband block 4, the local signal generator 3a, the first mixer 2a, the local output terminals 22, 23, and the static DC offset compensator 7 are ON. As shown in (a), (e), (f) and (g), the remaining blocks are OFF. The static DC offset of the GSM900 MHz band appearing at the baseband output terminals 28, 29 is compensated by the operation of the static DC offset compensator 7 during the period T1 in the manner as described above, and the static DC offset compensation is finished at t2.

Next, the dynamic DC offset compensation in the GSM900 MHz band starts at t2. At this time, as shown in (d) of FIG. 9, the static DC offset compensator 7 is OFF. As shown in (e) of FIG. 9, the first dynamic DC offset compensator 12a, the test signal generator 11, and the test signal output terminals 30, 31 are ON. The dynamic DC offset of the GSM900 MHz band appearing at the baseband output terminals 28, 29 is compensated by the operation of the first dynamic DC offset compensator 12*a* during the period T2 in the manner as described above, and the dynamic DC offset compensation is finished at t3.

Next, the static DC offset compensation in the DCS1800 MHz band starts at t3. At this time, as shown in (d) and (f) of FIG. 9, the static DC offset compensator 7, the second mixer 2*b*, and the local output terminals 53, 54 are ON. As shown in (c) and (e), the first mixer 2*a*, the local output terminals 22, 23, the first dynamic DC offset compensator 12*a*, the test signal generator 11 and the test signal output terminals 30, 31 are OFF. The static DC offset of the DCS1800 MHz band appearing at the baseband output terminals 28, 29 is compensated by the operation of the static DC offset compensator 7 during the period T3 in the manner as described above, and the static DC offset compensation is finished at t4.

Next, the dynamic DC offset compensation in the DCS1800 MHz band starts at t4. At this time, as shown in (d) of FIG. 9, the static DC offset compensator 7 is OFF. As shown in (g) of FIG. 9, the second dynamic DC offset compensator 43, the test signal generator 11, and the test signal output terminals 55, 56 are ON. The dynamic DC offset of the DCS1800 MHz band appearing at the baseband output terminals 28, 29 is compensated by the operation of the second dynamic DC offset compensator 43 during the period T4 in the same manner as the first dynamic DC offset compensator 12*a*, and the dynamic DC offset compensation is finished at t5.

As described above, at t2 and t4, the dynamic DC offset of each band can be compensated at the baseband output terminals 28, 29, regardless of the magnitude of the static DC offset. Thus, a means for storing the static DC offset is not required to compensate for the dynamic DC offset in each of the bands.

Moreover, the procedure for the dynamic DC offset compensation is the same as that for the static DC offset compensation for both the GSM900 MHz band and the DCS1800 MHz band. The dynamic DC offset and the static DC offset are compensated in a time-division manner. Therefore, the successive approximation A/D converter including the comparator 8 and the SAR 9 can be shared between the static DC offset compensator 7 and the first and second dynamic DC offset compensators 12*a*, 43, so that the system can be simplified.

In the direct conversion radio receiver having a multiband function of Embodiment 2, the static DC offset compensation is performed when the dynamic DC offset compensation is performed in each of the bands. Therefore, the dynamic DC offset compensator for each band does not need to have a means for storing the static DC offset. This can prevent the system from being large and complicated. Moreover, the dynamic DC offset and the static DC offset are compensated in a time-division manner in each of the bands, so that the successive approximation A/D converter can be shared between the static DC offset compensator for compensating for the static DC offset of the first and second RF bands, the first dynamic DC offset compensator for compensating for the dynamic DC offset of the first RF band, and the second dynamic DC offset compensator for compensating for the dynamic DC offset of the second RF band. Accordingly, the system can be simplified.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A direct conversion receiver with a DC offset compensation function comprising:
    a mixer for converting an RF signal into a low-frequency baseband signal by mixing the RF signal and a local signal;
    a dynamic DC offset compensator for compensating for a dynamic DC offset caused by an effect of second order nonlinear distortion of the mixer on an interfering wave that enters input terminals of the mixer; and
    a static DC offset compensator for compensating for a static DC offset caused by self-mixing of a local signal and a leakage component of the local signal that appears at the input terminals of the mixer,
    wherein, the static DC offset compensator starts compensating for the static DC offset at a first time t1 after a DC offset compensation operation has started,
    the static DC offset compensation is finished at a second time t2, and then the dynamic DC offset compensator starts compensating for the dynamic DC offset, and
    the dynamic DC offset compensation is finished at a third time t3, thereby compensating for only a change in DC offset due to the dynamic DC offset after compensation of the static DC offset component, and
    wherein the dynamic DC offset compensator does not have an element for storing magnitude of the static DC offset.

2. The direct conversion receiver according to claim 1, comprising:
    an RF amplifier composed of a low noise amplifier for amplifying an RF signal;
    a local signal generator for generating a local signal;
    the mixer for converting the RF signal output from the RF amplifier into a low-frequency baseband signal by mixing the RF signal and the local signal;
    a baseband block comprising a LPF for attenuating an interfering wave and a variable gain amplifier, wherein the interfering wave is removed from the RF signal, and magnitude of the baseband signal is maintained constant regardless of magnitude of the RF signal;
    a successive approximation A/D converter comprising a comparator and a successive approximation register (referred to as "SAR" in the following), wherein the comparator detects polarity of a DC offset appearing at output terminals of the baseband block, and the SAR compares an output of the comparator with the polarity of initial discrimination and outputs zero if the polarity is changed, and outputs 1 if the polarity is unchanged;
    a first D/A converter for outputting a compensation current corresponding to a digital signal output from the SAR and supplying it as a compensation signal to output terminals of the mixer;
    a second D/A converter for outputting a compensation current corresponding to a digital signal output from the SAR;
    a detector for detecting magnitude of the RF signal entering the mixer;
    a controller for controlling a value of the second D/A converter in accordance with magnitude of an output of the detector and generating a compensation current for the mixer; and
    a test signal generator for generating a test signal that causes the dynamic DC offset to occur at the output terminals of the mixer and supplying the test signal to output terminals of the RF amplifier, wherein the static DC offset compensator is composed of the successive approximation A/D converter and the first D/A converter, and compensates for the static DC offset at the output terminals of the baseband block, the dynamic DC offset compensator is composed of the successive approximation A/D converter, the second D/A converter, the detector, and the controller, and compensates for the dynamic DC offset in the mixer, and the dynamic DC offset and the static DC offset are compensated in a time-division manner, so that the successive approximation A/D converter is shared between the static DC offset compensator and the dynamic DC offset compensator.

3. A direct conversion receiver comprising:

a first RF amplifier composed of a low noise amplifier for amplifying an RF signal in a first RF band;

a second RF amplifier composed of a low noise amplifier for amplifying an RF signal in a second RF band that differs from the first RF band;

a local signal generator for generating a local signal in the first RF band and a local signal in the second RF band;

a first mixer for converting the RF signal output from the first RF amplifier into a low-frequency baseband signal by mixing the RF signal and the local signal in the first RF band;

a second mixer for converting the RF signal output from the second RF amplifier into a low-frequency baseband signal by mixing the RF signal and the local signal in the second RF band;

a baseband block comprising a LPF for attenuating an interfering wave and a variable gain amplifier, to which output signals from the first mixer and the second mixer are supplied, wherein the interfering wave is removed from each of the RF signal in the first RF band and the RF signal in the second RF band, and magnitude of the baseband signal is maintained constant regardless of magnitude of the RF signal in the first RF band and the RF signal in the second RF band;

a successive approximation A/D converter comprising a comparator and a successive approximation register (referred to as "SAR" in the following), wherein the comparator detects polarity of a DC offset appearing at output terminals of the baseband block, and the SAR compares an output of the comparator with the polarity of initial discrimination and outputs zero if the polarity is changed, and outputs 1 if the polarity is unchanged;

a first D/A converter for outputting a compensation current corresponding to a digital signal output from the SAR and supplying it as a compensation signal to output terminals of the first mixer and the second mixer;

a second D/A converter for outputting a compensation current corresponding to a digital signal output from the SAR;

a first detector for detecting magnitude of the RF signal entering the first mixer;

a first controller for controlling a value of the second D/A converter in accordance with magnitude of an output of the first detector and generating a compensation current for the first mixer;

a third D/A converter for outputting a compensation current corresponding to a digital signal output from the SAR;

a second detector for detecting magnitude of the RF signal entering the second mixer;

a second controller for controlling a value of the third D/A converter in accordance with magnitude of an output of the second detector and generating a compensation current for the second mixer; and a test signal generator for generating test signals that cause the dynamic DC offset of the first RF band and the dynamic DC offset of the second RF band to occur at the output terminals of the first mixer and the second mixer and supplying the test signals to output terminals of the first RF amplifier and the second RF amplifier, respectively, wherein the successive approximation A/D converter and the first D/A converter constitute a static DC offset compensator that compensates for the static DC offsets of the first RF band and the second RF band at the output terminals of the baseband block, the successive approximation A/D converter, the second D/A converter, the first detector, and the first controller constitute a first dynamic DC offset compensator that compensates for the dynamic DC offset of the first RF band in the first mixer, and the successive approximation A/D converter, the third D/A converter, the second detector, and the second controller constitute a second dynamic DC offset compensator that compensates for the dynamic DC offset of the second RF band in the second mixer, wherein the static DC offset compensator starts compensating for the static DC offset of the first RF band at a first time t1 after a DC offset compensation operation has started, the static DC offset compensation in the first RF band is finished at a second time t2, and then the first dynamic DC offset compensator starts compensating for the dynamic DC offset of the first RF band, the dynamic DC offset compensation in the first RF band is finished at a third time t3, and then the static DC offset compensator starts compensating for the static DC offset of the second RF band, the static DC offset compensation in the second RF band is finished at a fourth time t4, and then the second dynamic DC offset compensator starts compensating for the dynamic DC offset of the second RF band, and the dynamic DC offset compensation in the second RF band is finished at a fifth time t5, and wherein the dynamic DC offset and the static DC offset in each of the RF bands are compensated in a time-division manner, and the dynamic DC offset of the second RF band is compensated after compensating for the dynamic DC offset of the first RF band, so that the successive approximation A/D converter is shared between the static DC offset compensator and the first and second dynamic DC offset compensators.

* * * * *